US012289275B2

(12) United States Patent
Ibrahim et al.

(10) Patent No.: US 12,289,275 B2
(45) Date of Patent: Apr. 29, 2025

(54) CROSS-LINK INTERFERENCE REPORTING IN FULL DUPLEX

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/643,120

(22) Filed: Dec. 7, 2021

(65) Prior Publication Data

US 2023/0179390 A1    Jun. 8, 2023

(51) Int. Cl.
*H04L 5/14*    (2006.01)
*H04L 5/00*    (2006.01)

(52) U.S. Cl.
CPC .......... *H04L 5/1461* (2013.01); *H04L 5/0053* (2013.01); *H04L 5/0085* (2013.01)

(58) Field of Classification Search
CPC ... H04L 5/1461; H04L 5/0053; H04L 5/0085; H04L 5/0091; H04L 5/0094; H04W 24/10
See application file for complete search history.

(56) References Cited

U.S. PATENT DOCUMENTS

2018/0323916 A1* 11/2018 Yang .................... H04L 5/0053
2019/0132824 A1*  5/2019 Jeon ......................... H04L 5/00
2019/0215712 A1*  7/2019 Babaei .................. H04L 5/001

FOREIGN PATENT DOCUMENTS

WO    WO-2022250511 A1 * 12/2022   ........... H04B 17/345

OTHER PUBLICATIONS

Machine translated version of patent WO 2022250511 retrieved from PE2E on Feb. 23, 2024 (Year: 2022).*
Definition of 'occasion' retrieved from Dictionary.com on Feb. 27, 2024.*
Machine translated version of WO-2022250511-A1 (Year: 2022).*
Machine translated English version of WO 2022250511 A1 retrieved from PE2E on Dec. 19, 2024 (Year: 2022).*

(Continued)

*Primary Examiner* — Mohamed A Kamara
*Assistant Examiner* — Rachel Elizabeth Marks
(74) *Attorney, Agent, or Firm* — Paul M. McAdams; Harrity & Harrity, LLP

(57) ABSTRACT

Various aspects of the present disclosure generally relate to wireless communication. In some aspects, a network node may receive a group common downlink control information transmission comprising a cross-link interference (CLI) measurement request indication. The network node may determine a channel state information interference measurement during an interference measurement occasion, wherein the interference measurement occasion is indicated by the CLI measurement request indication. Numerous other aspects are described.

38 Claims, 22 Drawing Sheets

(56) References Cited

OTHER PUBLICATIONS

International Search Report and Written Opinion—PCT/US2022/080687—ISA/EPO—May 30, 2023.
Partial International Search Report—PCT/US2022/080687—ISA/EPO—Apr. 5, 2023.
ZTE: "Contents for Group-Common Pdcch", 3GPP TSG RAN WG1 Meeting #90, R1-1712445, 3rd Generation Partnership Project, Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017, XP051315261, 4 pages, abstract paragraph [0001].

* cited by examiner

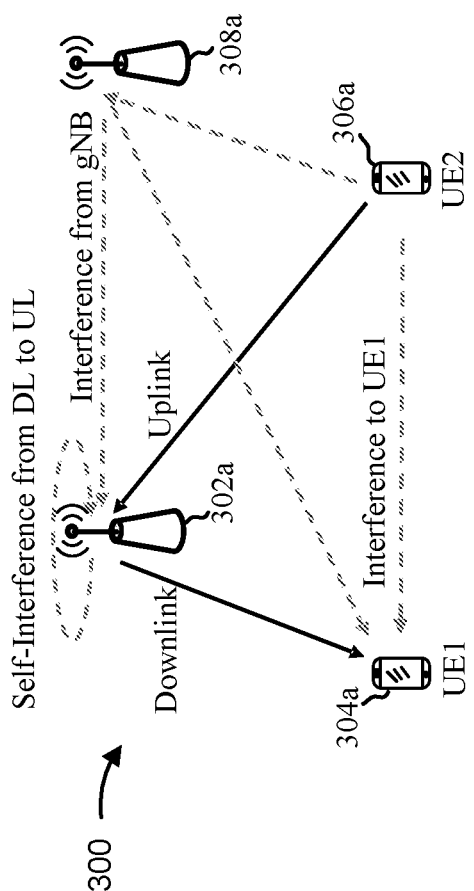
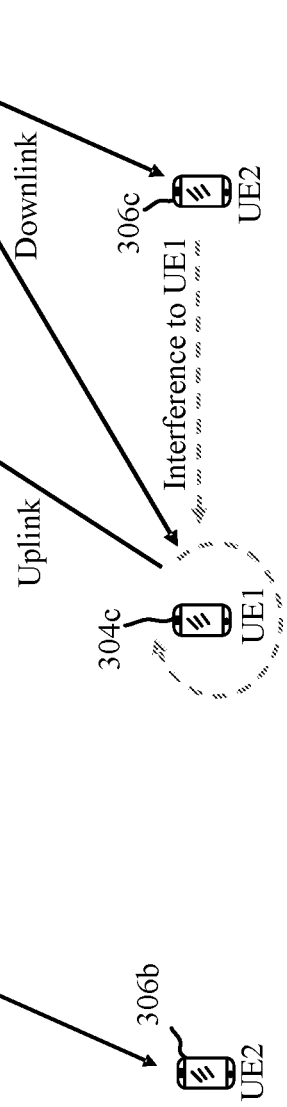
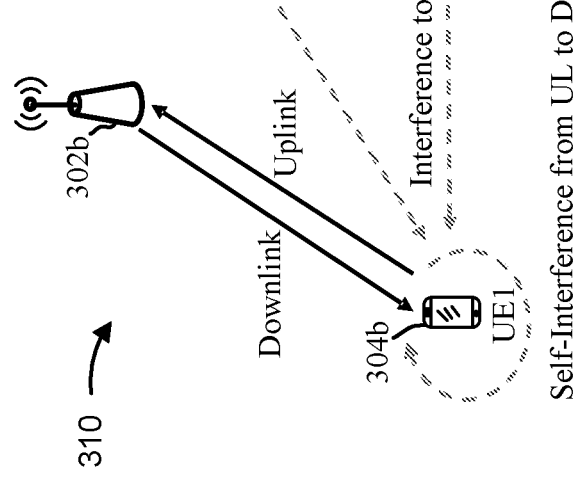
FIG. 3A
FIG. 3B
FIG. 3C

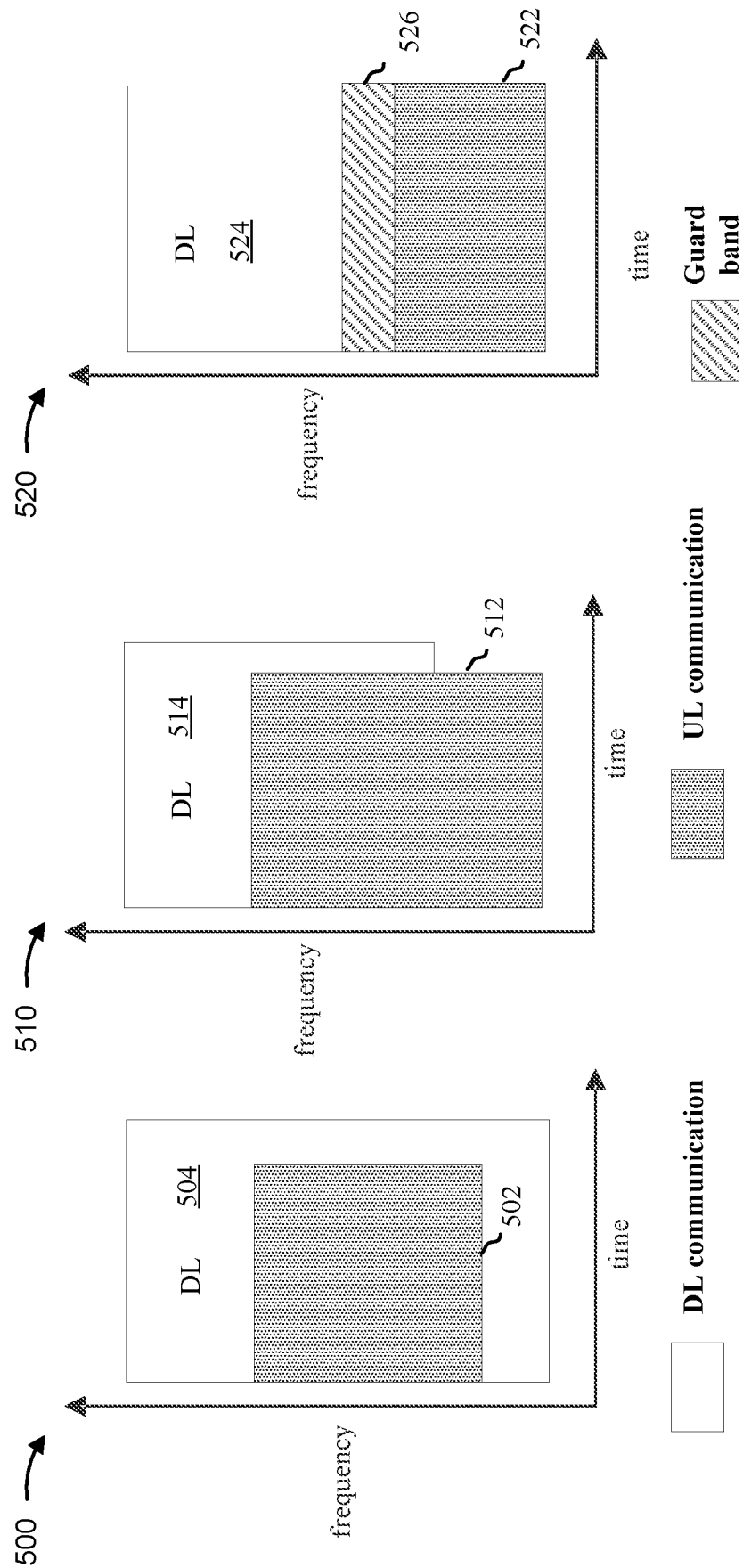

1100

DCI Position 1 → | Block 0 | Block 1 | ... | Block B |

DCI Position 1 → | Block 0 | Block 1 | ... | Block B1 | Block 0 | Block 1 | ... | Block B2 | ← DCI Position 2

FIG. 11B

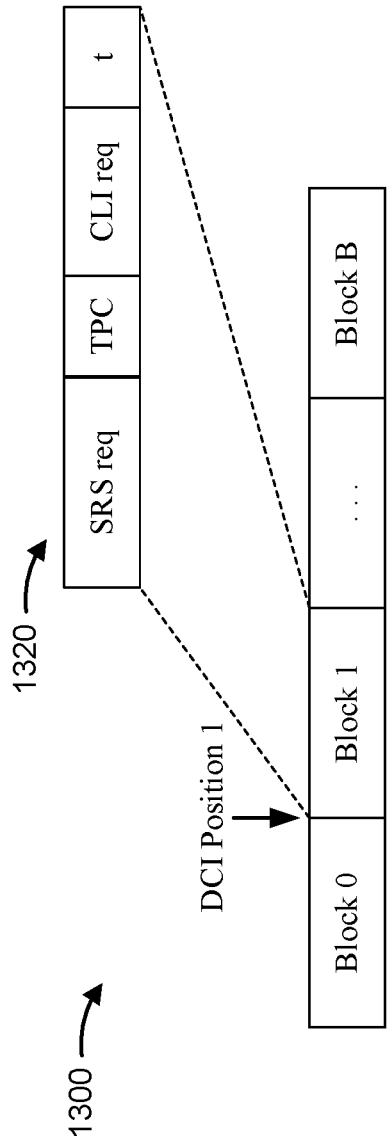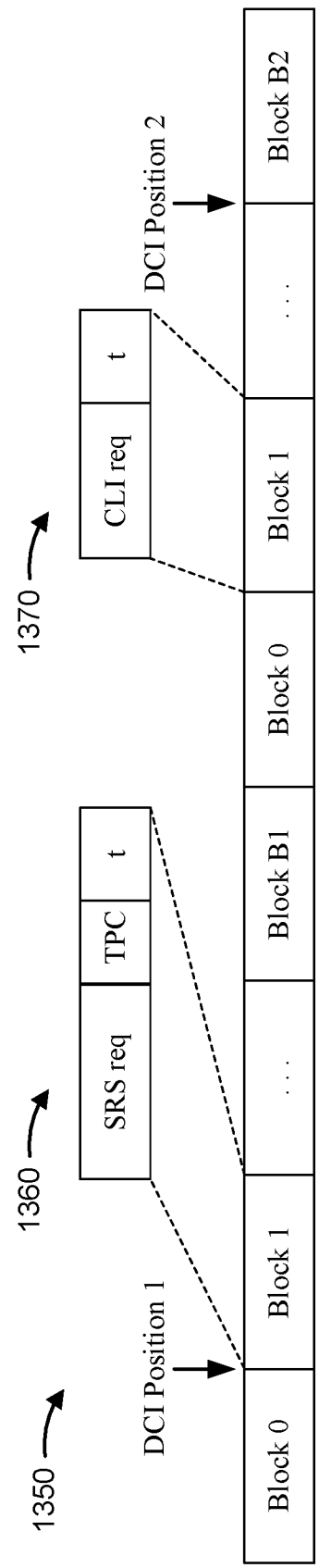
FIG. 13A
FIG. 13B

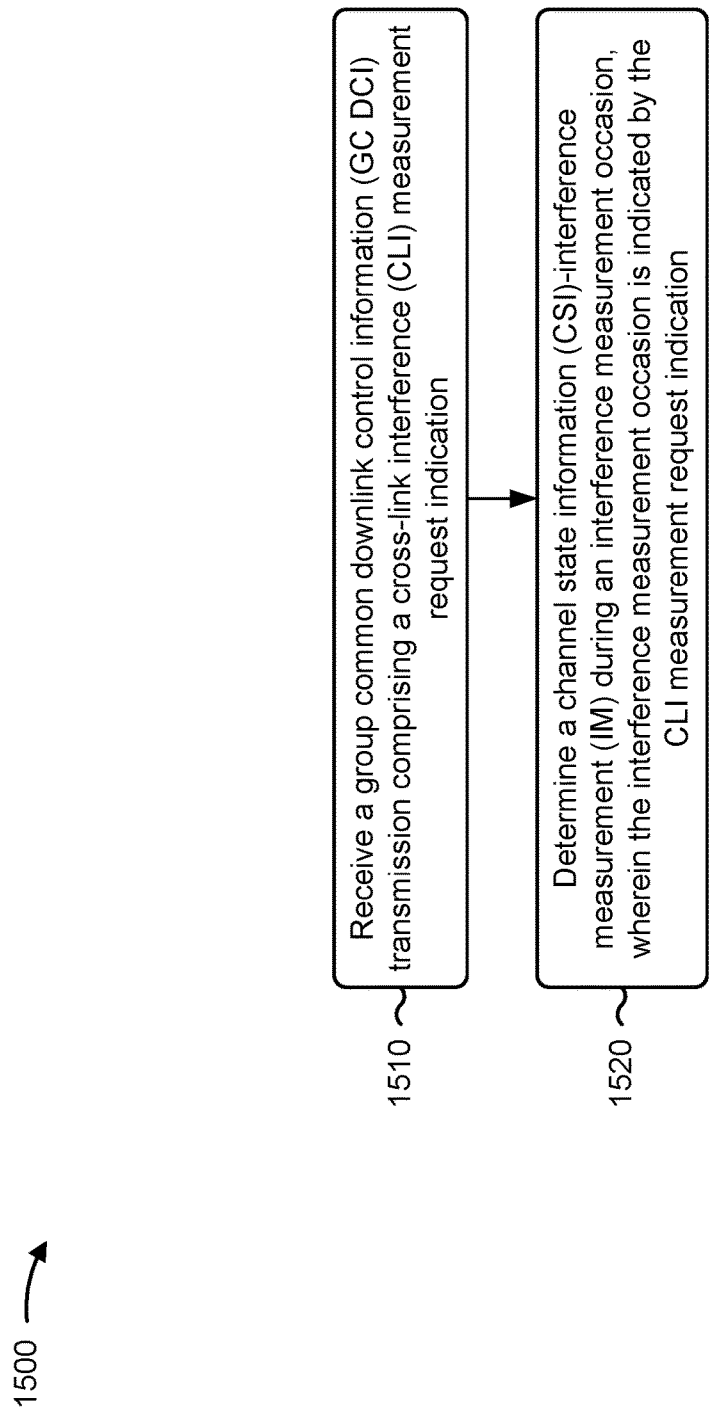

CROSS-LINK INTERFERENCE REPORTING IN FULL DUPLEX

FIELD OF THE DISCLOSURE

Aspects of the present disclosure generally relate to wireless communication and to techniques and apparatuses for cross-link interference reporting in full duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and at least one processor communicatively coupled to the memory. The at least one processor may be configured to receive a group common downlink control information (GC DCI) transmission comprising a cross-link interference (CLI) measurement request indication. The at least one processor may be configured to determine a channel state information (CSI)-interference measurement (IM) during an interference measurement occasion, wherein the interference measurement occasion is indicated by the CLI measurement request indication.

Some aspects described herein relate to a first network node for wireless communication. The first network node may include a memory and at least one processor communicatively coupled to the memory. The at least one processor may be configured to transmit a GC DCI transmission comprising a CLI measurement request indication. The at least one processor may be configured to receive CLI information based on a CSI-IM associated with an interference measurement occasion, wherein the interference measurement occasion is indicated by the CLI measurement request indication.

Some aspects described herein relate to a network node for wireless communication. The network node may include a memory and at least one processor communicatively coupled to the memory. The at least one processor may be configured to receive a GC DCI transmission comprising an aperiodic sounding reference signal (A-SRS) request indication. The at least one processor may be configured to transmit an SRS based on the A-SRS request indication.

Some aspects described herein relate to a network node for wireless communication. The network node may include a memory and at least one processor communicatively coupled to the memory. The at least one processor may be configured to receive a GC DCI transmission that schedules a transmission of CLI measurement information. The at least one processor may be configured to transmit the CLI measurement information based on the GC DCI transmission.

Some aspects described herein relate to a method of wireless communication performed by a first network node. The method may include receiving a GC DCI transmission comprising a CLI measurement request indication. The method may include determining a CSI-IM during an interference measurement occasion, wherein the interference measurement occasion is indicated by the CLI measurement request indication.

Some aspects described herein relate to a method of wireless communication performed by a first network node. The method may include transmitting a GC DCI transmission comprising a CLI measurement request indication. The method may include receiving CLI information based on a CSI-IM associated with an interference measurement occasion, wherein the interference measurement occasion is indicated by the CLI measurement request indication.

Some aspects described herein relate to a method of wireless communication performed by a network node. The method may include receiving a GC DCI transmission comprising an A-SRS request indication. The method may include transmitting an SRS based on the A-SRS request indication.

Some aspects described herein relate to a method of wireless communication performed by a network node. The method may include receiving a GC DCI transmission that schedules a transmission of CLI measurement information. The method may include transmitting the CLI measurement information based on the GC DCI transmission.

Some aspects described herein relate to a non-transitory computer-readable medium that stores a set of instructions for wireless communication by a first network node. The set of instructions, when executed by at least one processor of the first network node, may cause the first network node to receive a GC DCI transmission comprising a CLI measurement request indication. The set of instructions, when executed by at least one processor of the first network node, may cause the first network node to determine a CSI-IM during an interference measurement occasion, wherein the interference measurement occasion is indicated by the CLI measurement request indication.

Some aspects described herein relate to a non-transitory computer-readable medium that stores a set of instructions for wireless communication by a first network node. The set of instructions, when executed by at least one processor of the first network node, may cause the first network node to transmit a GC DCI transmission comprising a CLI measurement request indication. The set of instructions, when executed by at least one processor of the first network node, may cause the first network node to receive CLI information based on a CSI-IM associated with an interference measurement occasion, wherein the interference measurement occasion is indicated by the CLI measurement request indication.

Some aspects described herein relate to a non-transitory computer-readable medium that stores a set of instructions for wireless communication by a network node. The set of instructions, when executed by at least one processor of the network node, may cause the network node to receive a GC DCI transmission comprising an A-SRS request indication. The set of instructions, when executed by at least one processor of the network node, may cause the network node to transmit an SRS based on the A-SRS request indication.

Some aspects described herein relate to a non-transitory computer-readable medium that stores a set of instructions for wireless communication by a network node. The set of instructions, when executed by at least one processor of the network node, may cause the network node to receive a GC DCI transmission that schedules a transmission of CLI measurement information. The set of instructions, when executed by at least one processor of the network node, may cause the network node to transmit the CLI measurement information based on the GC DCI transmission.

Some aspects described herein relate to an apparatus for wireless communication. The apparatus may include means for receiving a GC DCI transmission comprising a CLI measurement request indication. The apparatus may include means for determining a CSI-IM during an interference measurement occasion, wherein the interference measurement occasion is indicated by the CLI measurement request indication.

Some aspects described herein relate to an apparatus for wireless communication. The apparatus may include means for transmitting a GC DCI transmission comprising a CLI measurement request indication. The apparatus May include means for receiving CLI information based on a CSI-IM associated with an interference measurement occasion, wherein the interference measurement occasion is indicated by the CLI measurement request indication.

Some aspects described herein relate to an apparatus for wireless communication. The apparatus may include means for receiving a GC DCI transmission comprising an A-SRS request indication. The apparatus may include means for transmitting an SRS based on the A-SRS request indication.

Some aspects described herein relate to an apparatus for wireless communication. The apparatus may include means for receiving a GC DCI transmission that schedules a transmission of CLI measurement information. The apparatus may include means for transmitting the CLI measurement information based on the GC DCI transmission.

The foregoing broadly outlines example features and example technical advantages of examples according to the disclosure. Additional example features and example are described herein.

BRIEF DESCRIPTION OF THE DRAWINGS

The drawings illustrate certain example aspects of this disclosure and are therefore not limiting in scope. The same reference numbers in different drawings may identify the same or similar elements.

FIGS. 3A-3C are diagrams illustrating various modes of full-duplex communication, in accordance with the present disclosure.

FIGS. 5A and 5B illustrate a first example and a second example of in-band full duplex (IBFD) resources.

FIG. 5C illustrates an example of sub-band full-duplex (SBFD) resources.

FIGS. 11A and 11B illustrate group common downlink control information (GC-DCI) payloads that each have a plurality of blocks.

FIGS. 12-14B are diagrams illustrating examples associated with cross-link interference (CLI) reporting in full duplex communications, in accordance with the present disclosure.

FIGS. 15-20 are diagrams illustrating example processes associated with CLI reporting in full duplex communications, in accordance with the present disclosure.

DETAILED DESCRIPTION

Figure 1:
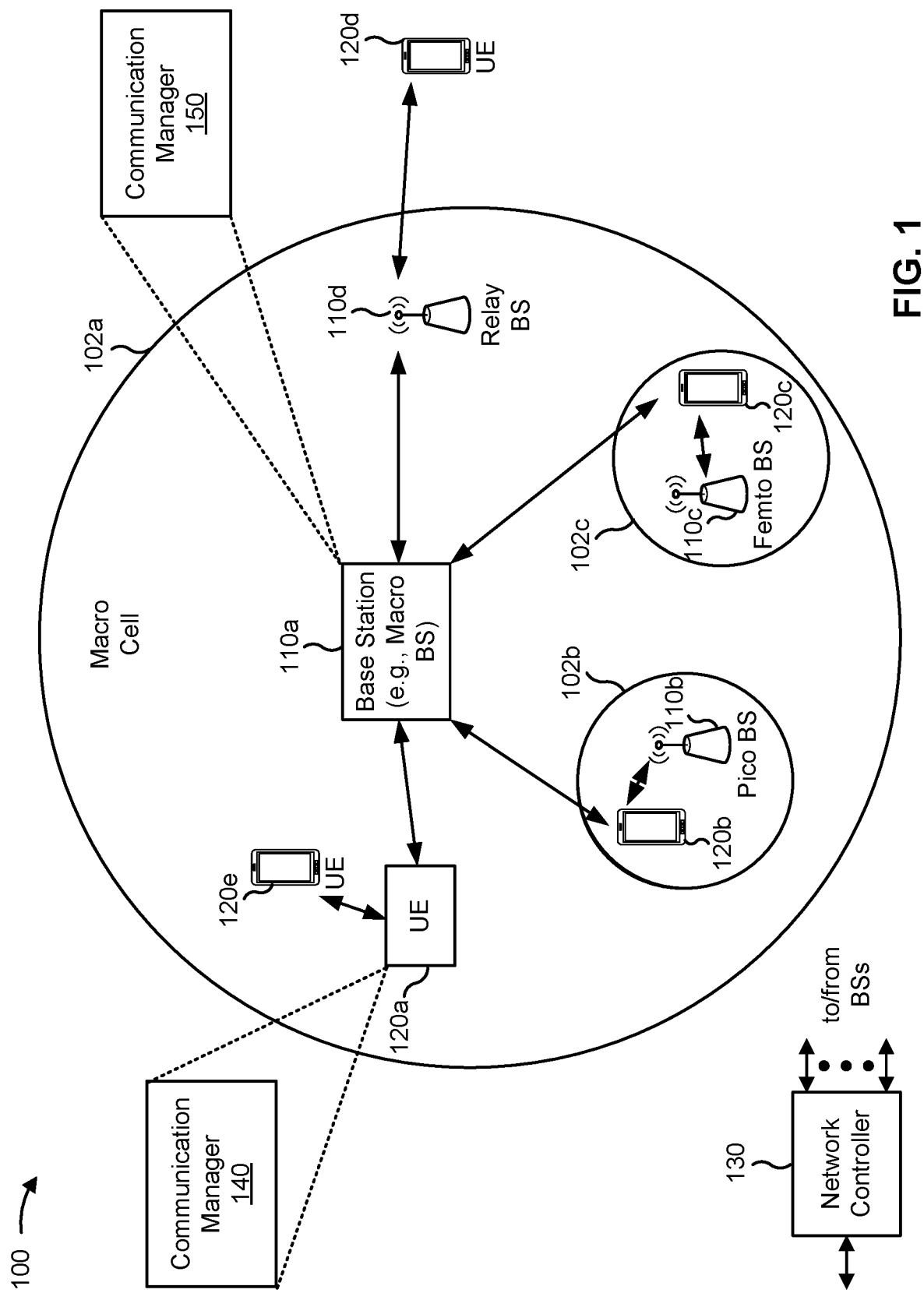
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure, function, example, aspect, or the like presented throughout this disclosure. This disclosure includes, for example, any structure, function, example, aspect, or the like disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims.

Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other device, system, apparatus, or the like that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FRI, FR2, FR3, FR4, FR4-a, FR4-1, and/or FR5) may be modified, and techniques described herein are applicable to those modified frequency ranges.

As described herein, a node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. In one aspect of the example above, the first network node may be a first UE, the second network node may be a base station, and the third network node may be a second UE. In another aspect of this example, the first network node may be a first UE, the second network node may be a first base station, and the third network node may be a second base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information from the second network; and the second network node may refer to a second UE, a second base station, a second apparatus, a second device, a second computing system, a first one or more components, a first processing entity, or the like.

In some aspects, a network node may include a communication manager 140. As described in more detail elsewhere herein, the communication manager 140 may receive a group common downlink control information (GC DCI) transmission comprising a cross-link interference (CLI) measurement request indication; and determine a channel state information (CSI) interference measurement (IM) during an interference measurement occasion, wherein the interference measurement occasion is indicated by the CLI measurement request indication. As described in more detail elsewhere herein, the communication manager 140 may receive a GC DCI transmission comprising an aperiodic sounding reference signal (A-SRS) request indication; and transmit an SRS based on the A-SRS request indication. As described in more detail elsewhere herein, the communication manager 140 may receive a DCI transmission that schedules a transmission of CLI that includes cross-link interference measurement information, wherein the DCI transmission includes an uplink shared channel indicator that indicates whether the CLI is to be transmitted on a physical uplink shared channel (PUSCH); and transmit the CLI based on the DCI transmission. Additionally, or alternatively, the communication manager 140 may perform one or more other operations described herein.

In some aspects, a network node may include a communication manager 150. As described in more detail elsewhere herein, the communication manager 150 may transmit a GC DCI transmission comprising a CLI measurement request indication; and receive CLI information based on CSI-IM associated with an interference measurement occasion, wherein the interference measurement occasion is indicated by the CLI measurement request indication. As described in more detail elsewhere herein, the communication manager 150 may transmit a GC DCI transmission comprising an A-SRS request indication; and receive an SRS based on the A-SRS request indication. As described in more detail elsewhere herein, the communication manager 150 may transmit a DCI transmission that schedules a transmission of CLI that includes cross-link interference measurement information, wherein the DCI transmission includes an uplink shared channel indicator that indicates whether the CLI is to be transmitted on a PUSCH; and receive the CLI based on the DCI transmission. Additionally, or alternatively, the communication manager 150 may perform one or more other operations described herein.

As indicated above, FIG. 1 is provided as an example. Other examples may differ from what is described with regard to FIG. 1.

Figure 2:
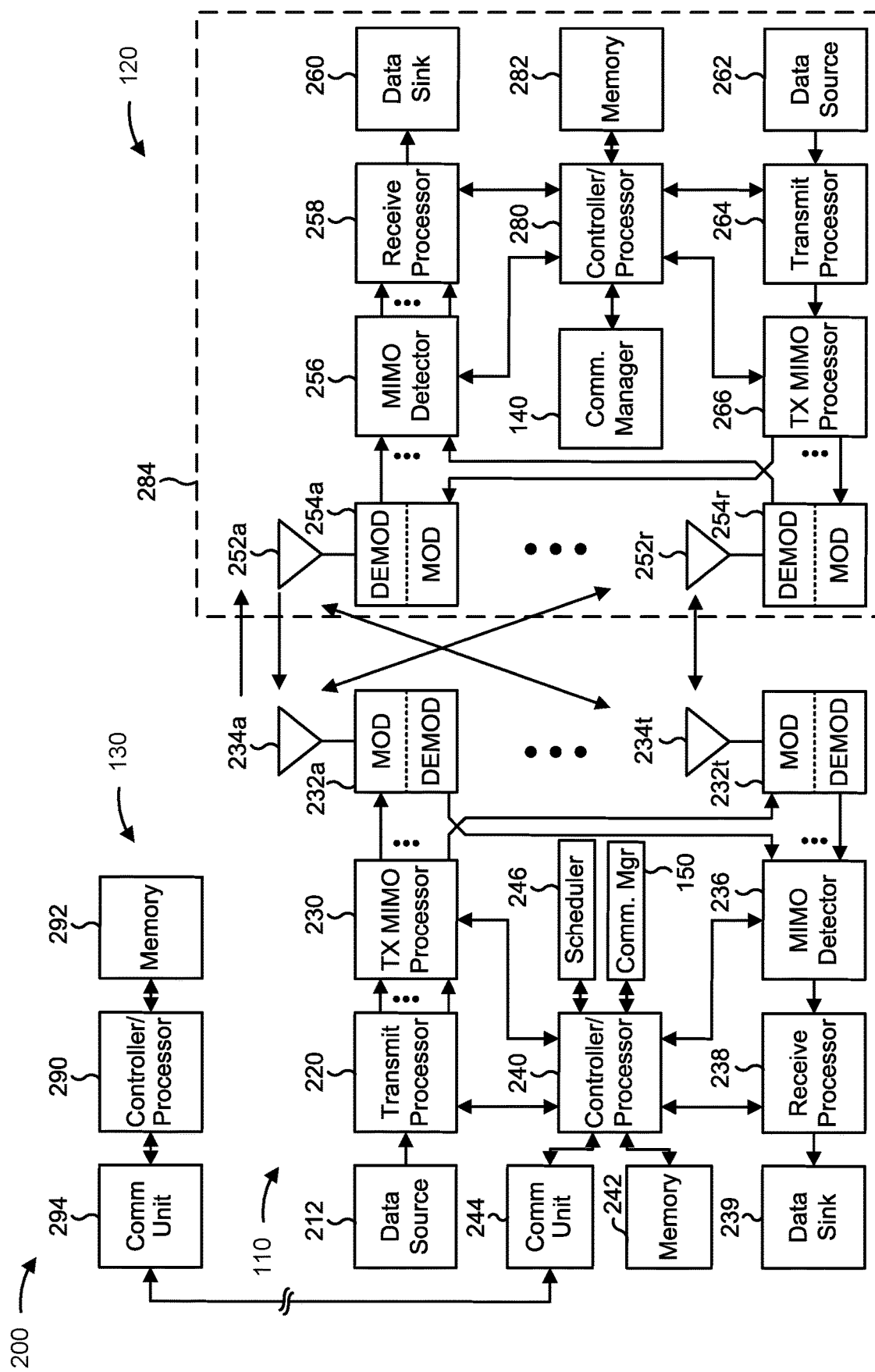
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended or destined for the UE 120 (or a set of UEs 120). The transmit processor 220 may select one or more modulation and coding schemes (MCSs) for the UE 120 based on one or more channel quality indicators (CQIs) received from that UE 120. The base station 110 may process (e.g., encode and modulate) the data for the UE 120 based on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 12-23).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 12-23).

The controller/processor 240 of the base station 110, the controller/processor 280 of the UE 120, and/or any other component(s) of FIG. 2 may perform one or more techniques associated with CLI reporting in full duplex communications, as described in more detail elsewhere herein. In some aspects, the network node (e.g., the first network node or the second network node) described herein is the UE 120, is included in the UE 120, or includes one or more components of the UE 120 shown in FIG. 2. In some aspects, the network node (e.g., the first network node or the second network node) described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 1600 of FIG. 16, process 1700 of FIG. 17, process 1800 of FIG. 18, process 1900 of FIG. 19, process 2000 of FIG. 20, process 2100 of FIG. 21, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1600 of FIG. 16, process 1700 of FIG. 17, process 1800 of FIG. 18, process 1900 of FIG. 19, process 2000 of FIG. 20, process 2100 of FIG. 21, and/or other processes as described herein. In some examples, executing instructions may include running the instructions, converting the instructions, compiling the instructions, and/or interpreting the instructions, among other examples.

In some aspects, a network node includes means for receiving a GC DCI transmission comprising a CLI measurement request indication; and/or means for determining a CSI-IM during an interference measurement occasion, wherein the interference measurement occasion is indicated by the CLI measurement request indication. In some aspects, the network node includes means for receiving a GC DCI transmission comprising an A-SRS request indication; and/or means for transmitting an SRS based on the A-SRS request indication. In some aspects, the network node includes means for receiving a DCI transmission that schedules a transmission of CSI that includes cross-link interference measurement information, wherein the DCI transmission includes an uplink shared channel indicator that indicates whether the CLI is to be transmitted on a PUSCH; and/or means for transmitting the CLI based on the DCI transmission. In some aspects, the means for the network node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node includes means for transmitting a GC DCI transmission comprising a CLI measurement request indication; and/or means for receiving CLI information based on a CSI-IM associated with an interference measurement occasion, wherein the interference measurement occasion is indicated by the CLI measurement request indication. In some aspects, the network node includes means for transmitting a GC DCI transmission comprising an A-SRS request indication; and/or means for receiving an SRS based on the A-SRS request indication. In some aspects, the network node includes means for transmitting a DCI transmission that schedules a transmission of CSI that includes cross-link interference measurement information, wherein the DCI transmission includes an uplink shared channel indicator that indicates whether the CLI is to be transmitted on a PUSCH; and/or means for receiving the CLI based on the DCI transmission. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating various modes of full-duplex communication, in accordance with the present disclosure. Full-duplex communication supports transmission and reception of information over a same frequency band and that overlap in time. In this manner, spectral efficiency may be improved with respect to the spectral efficiency of half-duplex communication, which supports transmission or reception of information in one direction at a time without overlapping uplink and downlink communications. Due to the simultaneous Tx/Rx nature of full-duplex communication, a UE or a base station can experience self-interference caused by signal leakage from its local transmitter to its local receiver. In addition, the UE or base station can also experience interference from other devices, such as transmissions from a second UE or a second base station. Such interference (e.g., self-interference or interference caused by other devices) can impact the quality of the communication, or even lead to a loss of information.

FIG. 3A shows a first example of full-duplex communication 300 in which a first base station 302*a* is in full duplex communication with a first UE 304*a* and a second UE 306*a*. "Full duplex communication" refers to transmission and reception that overlaps in time. The first base station 302*a* is a full-duplex base station, whereas the first UE 304*a* and the second UE 306*a* may be configured as either a half-duplex UE or a full-duplex UE. The second UE 306*a* may transmit a first uplink signal to the first base station 302*a* as well as to other base stations, such as a second base station 308*a* in proximity to the second UE 306*a*. The first base station 302*a* transmits a downlink signal to the first UE 304*a* concurrently with receiving the uplink signal from the second UE 306*a*. The base station 302*a* may experience self-interference from the receiving antenna that is receiving the uplink signal from UE 306*a* while also receiving some of the downlink signal being transmitted to the UE 304*a*. The base station 302*a* may experience additional interference due to signals from the second base station 308*a*. Interference may also occur for reception at the first UE 304*a* based on signals from the second base station 308*a* as well as from uplink signals from the second UE 306*a*.

FIG. 3B shows a second example of full-duplex communication 310 in which a first base station 302*b* is in full-duplex communication with a first UE 304*b*. In this example, the first base station 302*b* is a full-duplex base station and the first UE 304*b* is a full-duplex UE. A full-duplex base station is a base station that transmits and receives signals that overlap in time and within a same frequency range. A full-duplex UE is a UE that transmits and receives signals that overlap in time and within a same frequency range. For example, in FIG. 3B, the first base station 302*b* and the UE 304*b* may concurrently receive and transmit communication that overlaps in time in a same frequency band. The base station and the UE may each experience self-interference, in which a device's transmitted signal leaks to (e.g., is received by) a receiver at the same device. The first UE 304*b* may experience additional interference based on one or more signals emitted from a second UE 306*b* and/or a second base station 308*b* in proximity to the first UE 304*b*.

FIG. 3C shows a third example of full-duplex communication 320 in which a first UE 304*c* is a full-duplex UE in communication with a first base station 302*c* and a second base station 308*c*. The first base station 302*c* and the second base station 308*c* may serve as multiple transmission and reception points (multi-TRPs) for UL and DL communication with the UE 304*c*. The second base station 308*c* may be in communication with a second UE 306*c*. In FIG. 3C, the first UE 304*c* may concurrently transmit an uplink signal to the first base station 302*c* while receiving a downlink signal from the second base station 308*c*. The first UE 304*c* may experience self-interference as a result of the first signal and the second signal being communicated simultaneously (e.g., the uplink signal may leak to (e.g., be received by) the UE's receiver). The first UE 304*c* may experience additional interference from the second UE 306*c*.

As indicated above, FIGS. 3A-3C are provided as examples. Other examples may differ from what is described with regard to FIGS. 3A-3C.

Figure 4A:
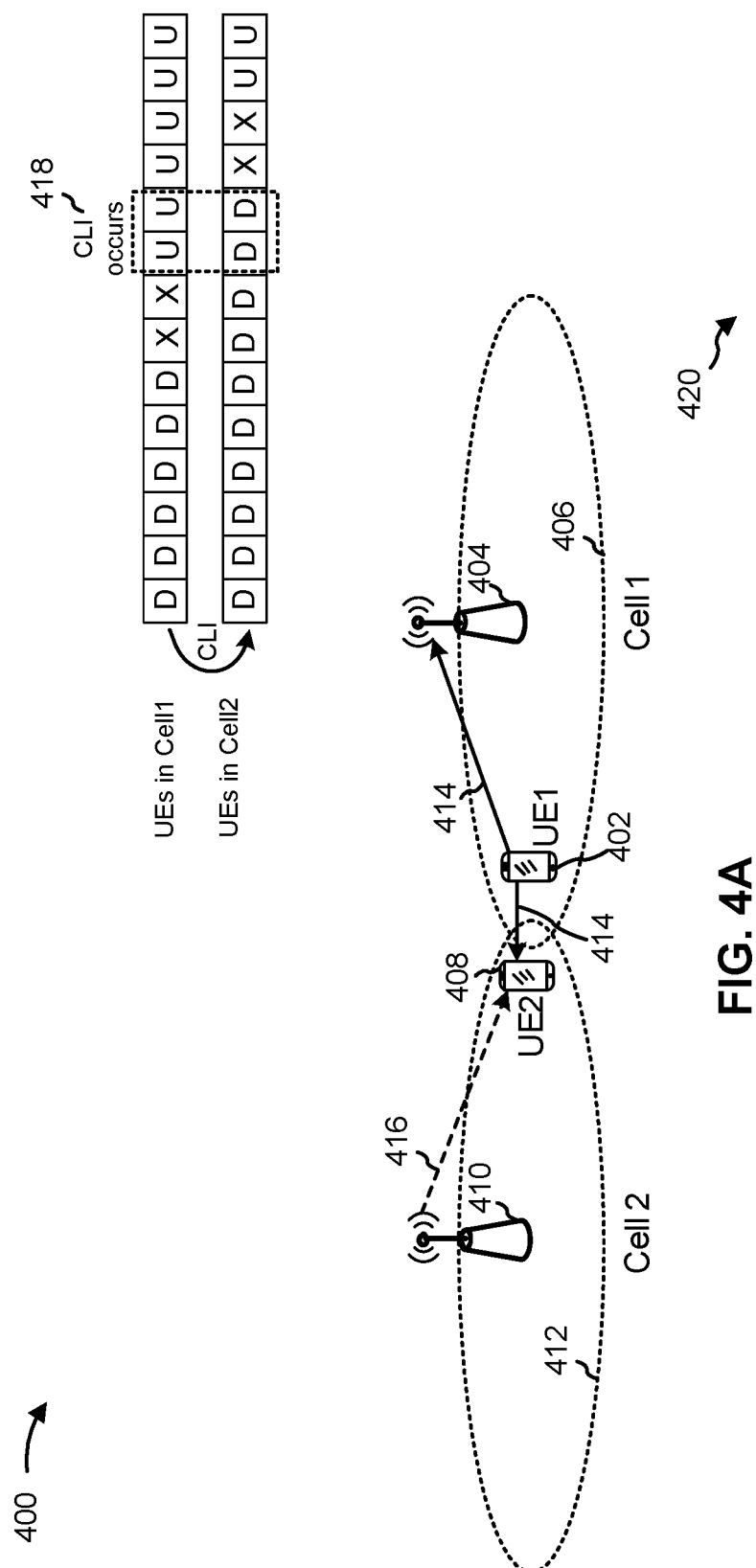
FIG. 4A is a diagram illustrating a wireless network operating in a semi-static time division duplex (TDD) configuration.
Figure 4B:
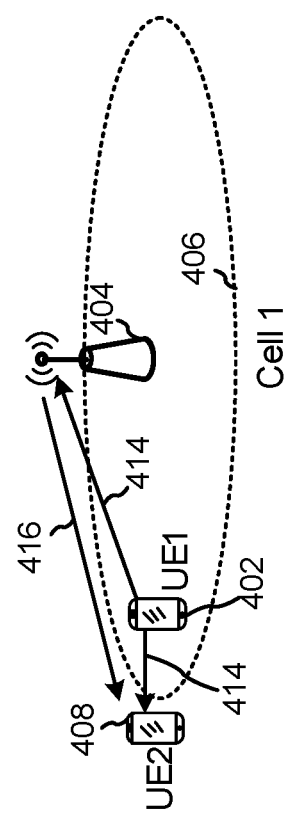
FIG. 4B is a diagram illustrating a wireless network operating in dynamic TDD configuration.

FIG. 4A is a diagram illustrating a wireless network 400 operating in a semi-static TDD configuration. FIG. 4B is a diagram illustrating a wireless network 420 operating in a dynamic TDD configuration. Dynamic TDD may enhance spectrum efficiency of wireless communication networks and provide a higher throughput by dynamically altering UL or DL transmission direction. However, if nearby UEs have different TDD UL-DL slot formats, one UE (e.g., UE2 408) may be a victim and may receive an UL transmission from another UE (e.g., UE1 402) known as an aggressor. The received UL transmission from the UE1 402 is known as cross link interference (CLI). CLI occurs when a UL symbol (e.g., an interfering symbol) of an aggressor collides with a DL symbol (e.g., an interfered symbol) of a victim. CLI may be caused by a UL transmission from the aggressor UE (e.g., UE1 402). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 4A, UE1 402 is within Cell 1 406 and is being served by base station 404, while UE2 408 is within Cell 2 412 and is being served by base station 410. CLI may occur between UEs at the cell edges of nearby cells, as UEs at cell edges of nearby cells may be in close proximity to each other. As shown in FIG. 4A, UE1 402 and UE2 408 are at their respective cell edges and may be communicating with their respective base stations. UE1 402 may send a UL transmission 414 to base station 404, while UE2 408 is receiving a DL transmission 416 from base station 410. However, in certain instances, the UL transmission 414 sent by UE1 402 to base station 404 may also be received by UE2 408 while receiving the DL transmission 416 from base station 410. The UL transmission 414 from UE1 402 received by UE2 408 may interfere with the DL transmission 416 to UE2 408 from base station 410. Thus, one or more UL symbols of the UL transmission 414 may collide with one or more DL symbols of the DL transmission 416. In the example of FIG. 4A, two UL symbols of the UL transmission 414 overlap or collide with two DL symbols of the DL transmission 416, such that CLI occurs at the overlap 418.

In the example of FIG. 4B, both UE1 402 and UE2 408 are being served by the same cell (e.g., cell 1 406). Both UE 1 402 and UE2 408 are near the cell edge, and in some instances, the UL transmission 414 sent by UE1 402 to base station 404 may also be received by UE2 408 while receiving the DL transmission 416 from base station 404. The UL transmission 414 from UE1 402 received by UE2 may interfere with the DL 416 of UE2 408 from the base station 404. As a result, one or more UL symbols of the UL transmission 414 may collide with one or more DL symbols of the DL transmission 416.

CLI measurement metrics include sounding reference signals reference signal received power (SRS-RSRP) and CLI-received signal strength indicator (CLI-RSSI). SRS-RSRP may include a linear average of the power contributions of the SRS to be measured over the configured resource elements within the considered measurement frequency bandwidth in the time resources in the configured measurement occasions. CLI-RSSI may include a linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered, and periodic reporting is supported. Layer3 (L3) filtering may be applied, such that for CLI-RSSI measurements, the implementation of the UE may determine whether to reset filtering upon a bandwidth part (BWP) switch. A dedicated measurement gap may not be needed.

As indicated above, FIGS. 4A and 4B are provided as one or more examples. Other examples may differ from what is described with regard to FIGS. 4A and 4B.

FIGS. 5A and 5B illustrate a first example 500 and a second example 510 of in-band full duplex (IBFD) resources. FIG. 5C illustrates an example 520 of sub-band full-duplex (SBFD) resources. In IBFD, signals may be transmitted and received in overlapping times and overlapping in frequency. As shown in the first example 500, a time and a frequency allocation of UL resources 502 may fully overlap with a time and a frequency allocation of DL resources 504. In the second example 510, a time and a frequency allocation of UL resources 512 may partially overlap with a time and a frequency allocation of DL resources 514.

In SBFD, uplink and downlink resources may overlap in time using different frequencies, as shown in FIG. 5C. As shown in FIG. 5C, the UL resources 522 are separated from the DL resources 524 by a guard band 526. The guard band may be frequency resources, or a gap in frequency resources, provided between the UL resources 522 and the DL resources 524. Separating the UL frequency resources and the DL frequency resources with a guard band may help to reduce self-interference. In some examples, a guard band might not be provided between the separate UL resources and DL resources. For example, UL resources and DL resources that are immediately adjacent may be considered to have a guard band width of 0. As an output signal (e.g., from a UE transmitter) may extend outside the UL resources, the guard band may reduce interference experienced by the UE. SBFD may also be referred to as "flexible duplex."

As indicated above, FIGS. 5A-5C are provided as examples. Other examples may differ from what is described with regard to FIGS. 5A-5C.

Figure 6:
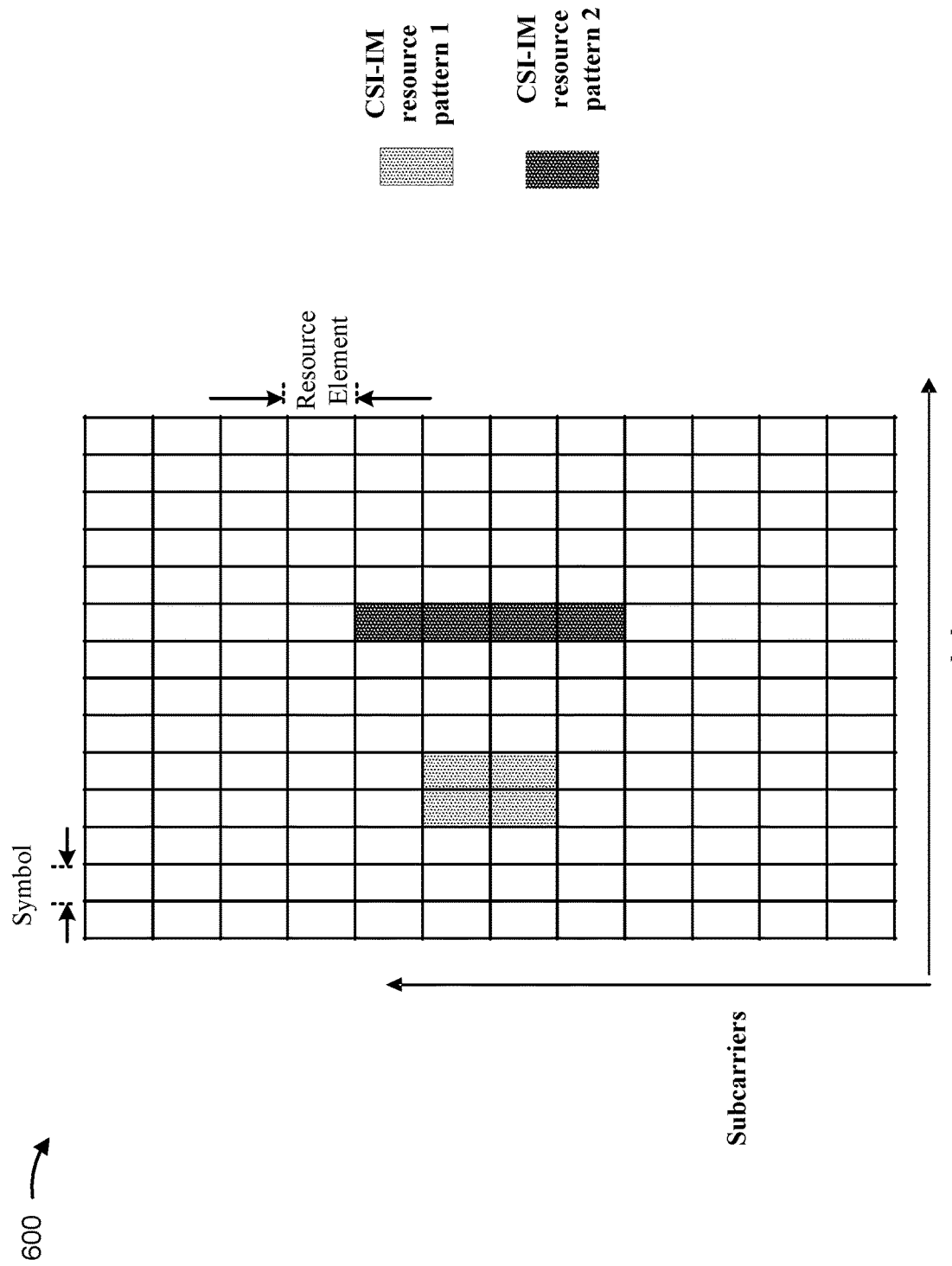
FIG. 6 illustrates two example patterns of CSI-IM resources.

CSI-IM resources may be configured by a base station for a UE to perform interference measurements to enable accurate CLI reporting that reflects inter-cell interference. FIG. 6 illustrates two example patterns of CSI-IM resources 600. A first pattern, which may be referred to as Pattern 0, includes two contiguous resource elements in two contiguous symbols. The second pattern, which may be referred to as Pattern 1, includes four contiguous resource elements in a single symbol. The size of the CSI-IM resource in frequency may be configured based on a starting resource block and a number of resource blocks. A CLI report configuration may indicate the CSI-IM resource set for the UE to use for interference measurements. The UE may then use the configured CSI-IM resources to measure interference at the UE and to report such interference to the base station that configured the CLI report.

As indicated above, FIG. 6 is provided as an example. Other examples may differ from what is described with regard to FIG. 6.

Figure 7:
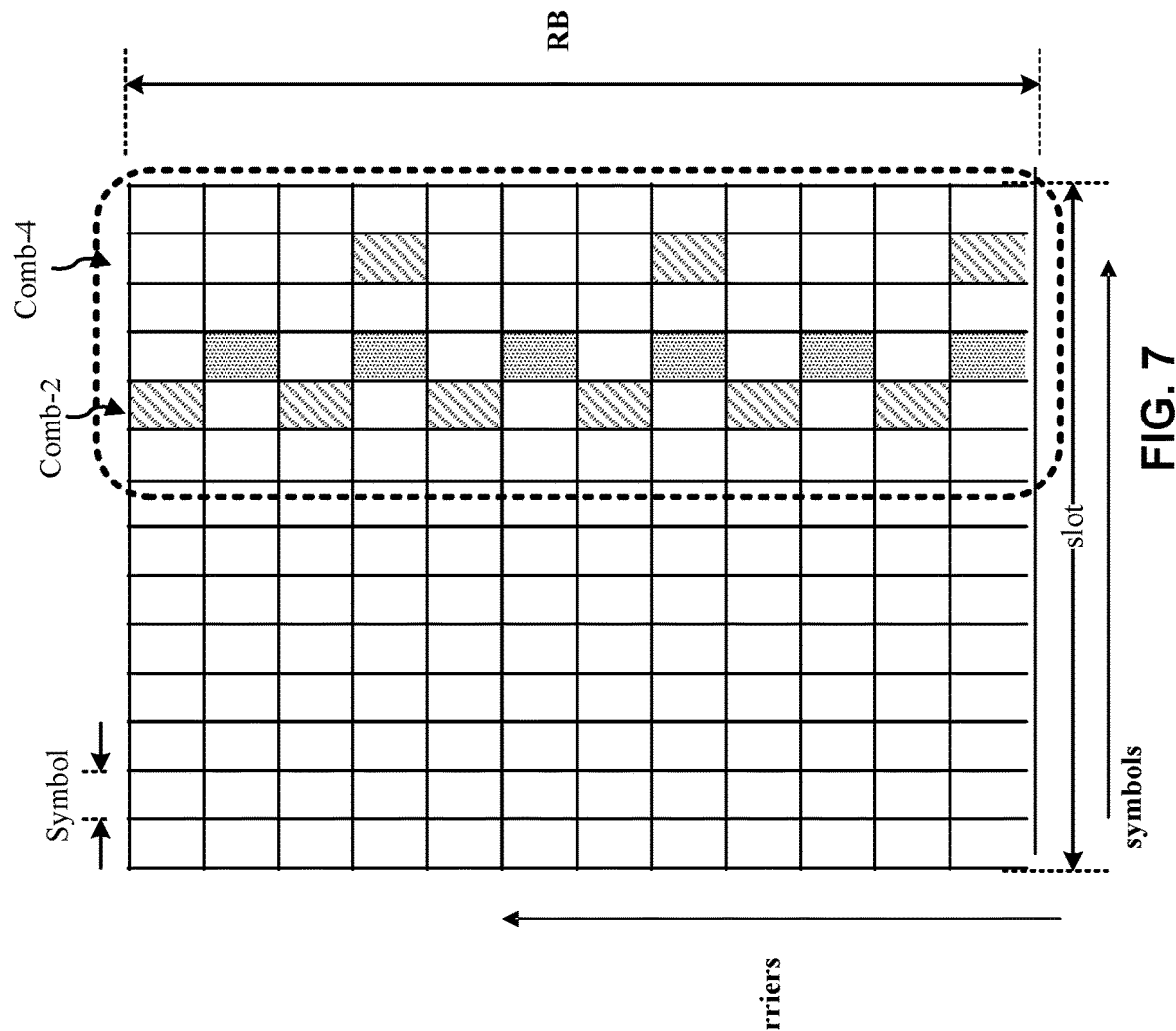
FIG. 7 illustrates examples of SRS resources for an uplink reference signal transmission by a network node.

FIG. 7 illustrates examples of SRS resources 700 for an uplink reference signal transmission by a UE. The SRS may be used by another UE to perform interference measurements. The SRS resources may be mapped to physical resources in a resource block. In time, the SRS resources may span up to four symbols and may be configured in the last six symbols of a slot. In the frequency domain, a comb-2 or a comb-4 SRS can be configured with a comb offset. The SRS resources may be configured in time and frequency. For example, the SRS resources may be periodic, aperiodic, or semi-persistent. The SRS may be configured with a periodicity and a slot offset, for example. The SRS may be configured for a sounding bandwidth within a bandwidth part (BWP). The SRS may be configured with a frequency hopping pattern.

As indicated above, FIG. 7 is provided as an example. Other examples may differ from what is described with regard to FIG. 7.

Figure 8:
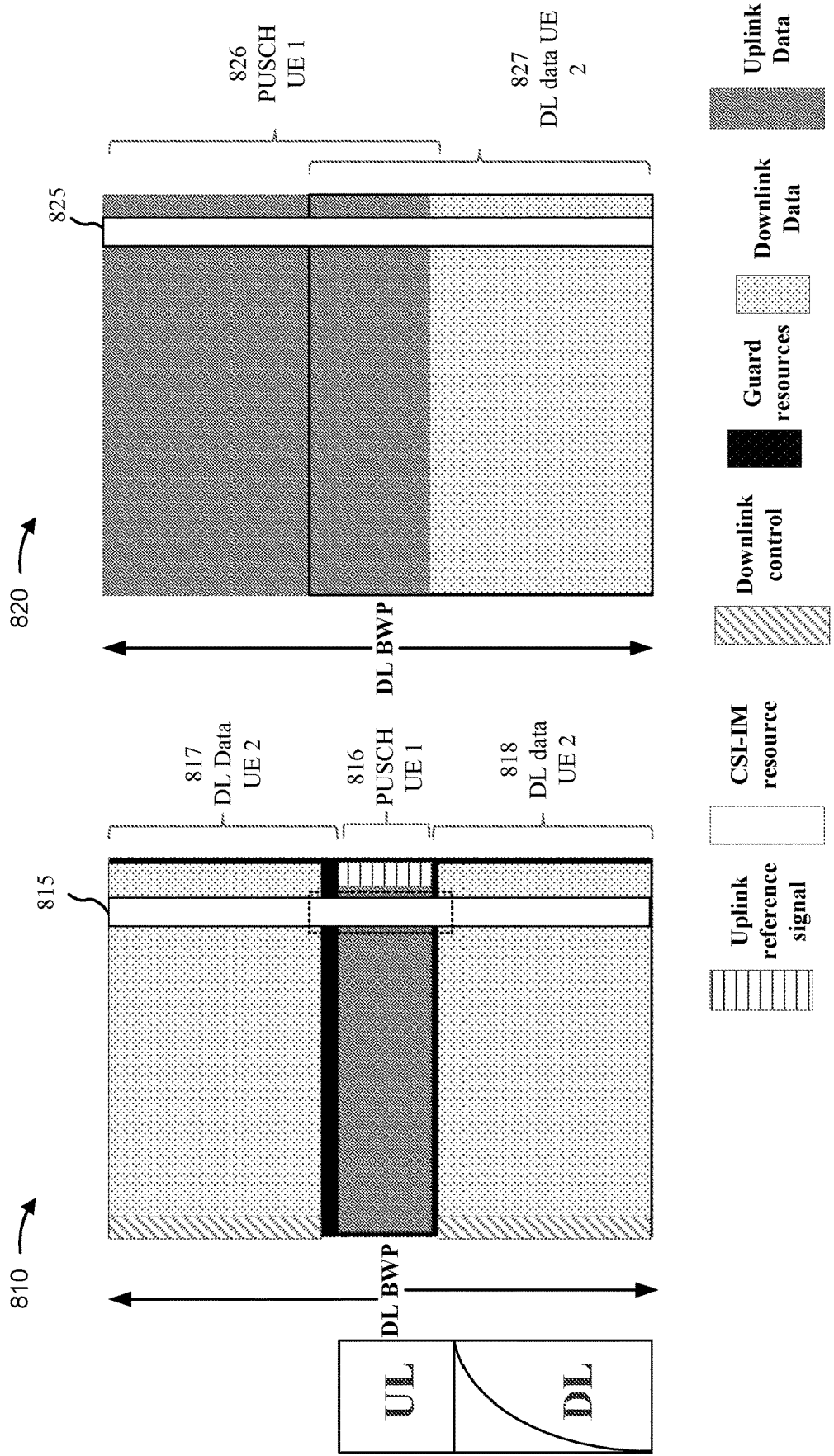
FIG. 8 illustrates examples of CSI-IM resources relative to full-duplex resources.

FIG. 8 illustrates examples of CSI-IM resources relative to full-duplex resources. In the SBFD example 810, the CSI-IM resources 815 include portions 817 and 818 that may be subject to inter-cell interference and CLI leakage and portion 816 that may mainly include CLI interference. The IBFD example 820 includes CSI-IM resources 825 having a portion 826 that is subject to CLI and a portion 827 that is subject to inter-cell interference and CLI leakage. Intra-cell CLI may limit the performance of some UEs. The CLI may be from uplink transmissions of nearby users in an IBFD mode or due to CLI leakage to downlink reception in an SBFD mode. For full-duplex communication, a base station may configure CSI-IM resources to extend in both the uplink and downlink portions of DL BWP in a full-duplex slot. The CSI-IM resources may enable a full-duplex aware UE or a full-duplex capable UE to measure different components of interference. The UE may measure interference levels in the configured CSI-IM resources (e.g., 815 or 825). The UE may calculate the contribution of CLI (e.g., based on a wideband or sub-band received signal strength indication (RSSI)). A victim UE may be configured to measure the CLI based on an uplink reference signal of nearby UEs (e.g., based on an SRS transmission).

As indicated above, FIG. 8 is provided as an example. Other examples may differ from what is described with regard to FIG. 8.

Figure 9:
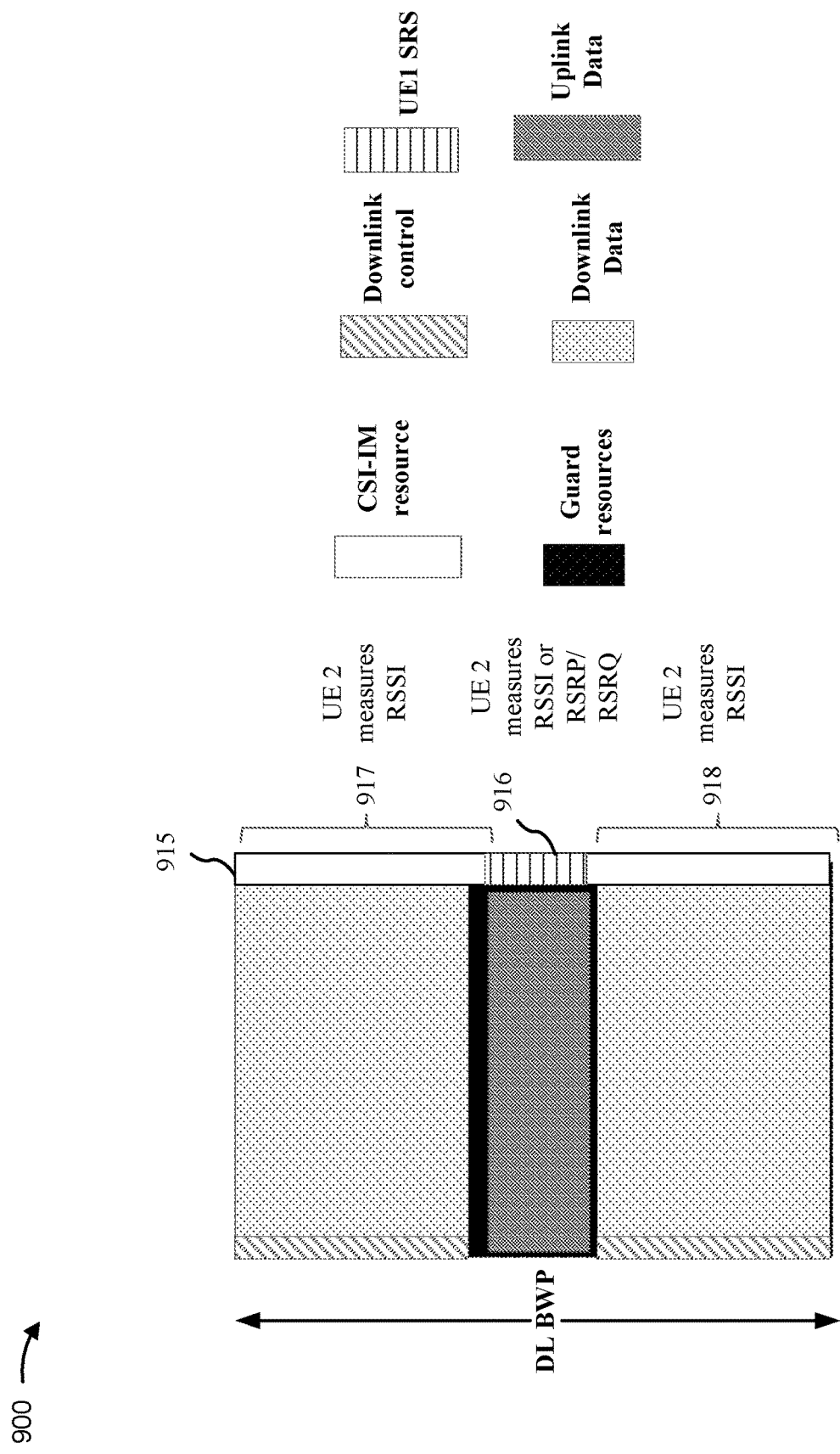
FIG. 9 illustrates example resources in time and frequency that include CSI-IM resources.

FIG. 9 illustrates example resources 900 in time and frequency that include CSI-IM resources 915. At portion 916, UE 1 may be configured to transmit SRSs, and UE 2 may be configured to measure CLI from UE1 based on the SRSs. The CSI-IM resources in the uplink portion may match the SRS allocation for the UE 1. UE 2, which experienced interference from UE 1, may measure CLI in the configured CSI-IM resources (e.g., based on an RSSI). In some examples, the UE may measure RSSI of CLI leakage in portions 917 and 918. The UE may also measure a reference signal received power (RSRP) and/or a reference signal received quality (RSRQ) in the sub-band corresponding to the SRS transmission at portion 916.

As indicated above, FIG. 9 is provided as an example. Other examples may differ from what is described with regard to FIG. 9.

Figure 10:
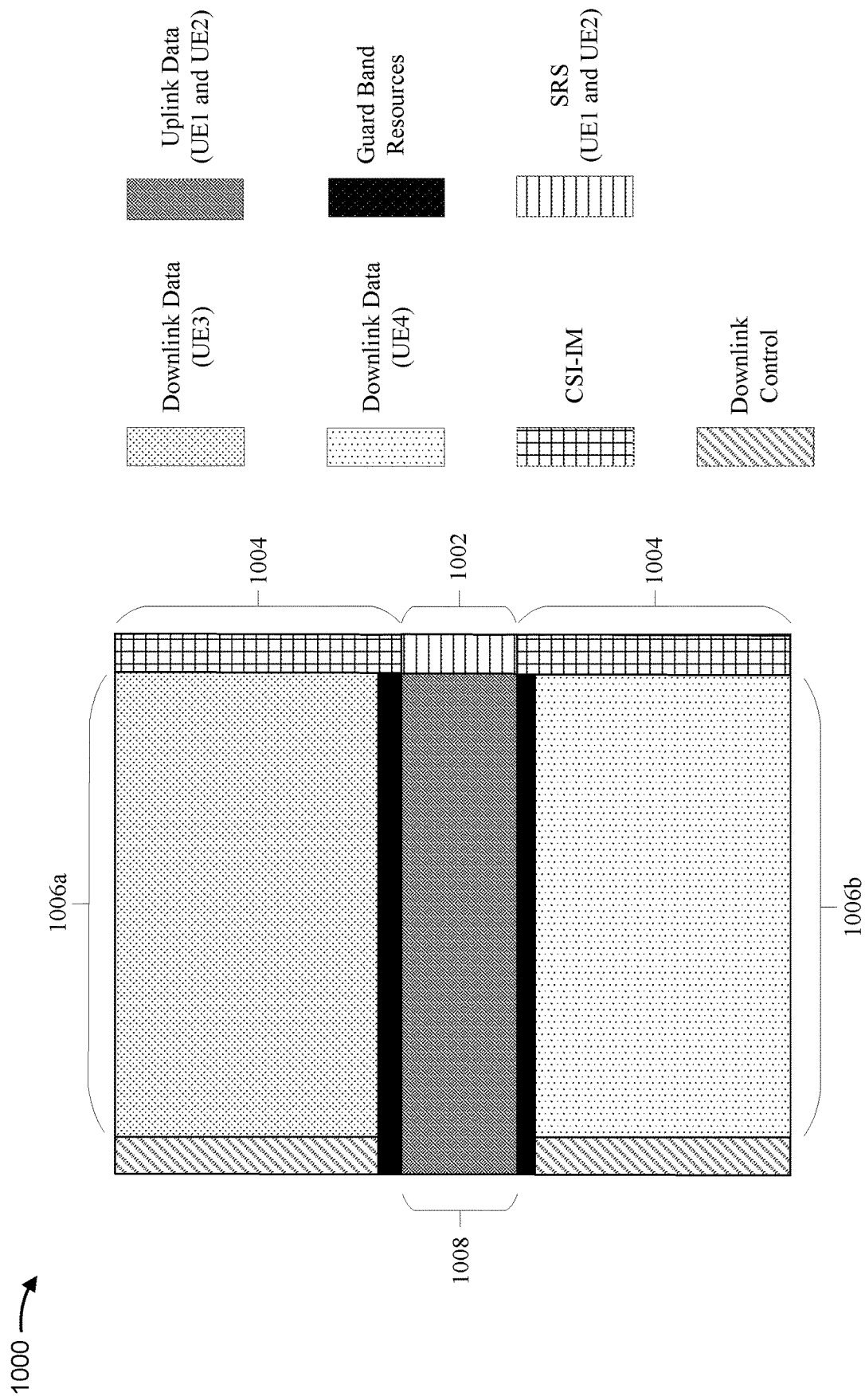
FIG. 10 illustrates an example allocation of time and frequency resources for multiple UEs.

FIG. 10 illustrates an example allocation of time and frequency resources 1000 for multiple UEs. In some aspects, a base station may configure a first UE for an SRS transmission 1002 and a second UE for CLI measurement and reporting via CSI-IM resources 1004. In further aspects, the base station may configure one or more UEs to perform multiple measurements at a same time. For example, a "victim" UE may measure CLI from multiple "aggressor" UEs, or an aggressor UE may measure CLI caused to multiple victim UEs. A "victim UE" may be a UE that receives interference from an aggressor UE while the victim UE is attempting to receive a DL data 1006a-b from the base station. An "aggressor UE" may be a UE that is transmitting UL data 1008 to the base station, where the transmitted UL data 1008 interferes with reception of the DL data 1006a-b of the victim UE.

Rather than separately triggering the SRS transmission 1002 and/or the CLI reporting for multiple UEs, common DCI may be grouped together to provide a mechanism for simultaneously triggering one or both of the SRS transmissions 1002 and the CLI measurements. Common DCI that is grouped together may be referred to as group common DCI (GC DCI). The base station may divide the multiple UEs into two or more sets of UEs that receive the common DCI (e.g., victim UEs and aggressor UEs). A particular UE may be a victim UE and an aggressor UE at a same time when operating in a full-duplex mode. For instance, if the particular UE utilizes the upper band of the time and frequency resources for the DL data 1006a and the particular UE utilizes the middle band for transmission of the UL data 1008, and another UE utilizes the lower band for receiving the DL data 1006b, the UL transmission may not only interfere with the DL reception of the other UE utilizing the lower band but may also cause self-interference/leakage to the DL reception in the upper band.

Common DCI may be grouped based on a first technique to configure multiple/victim UEs for CLI measurement and reporting. In some examples, a CSI-IM resource configuration may be provided from the base station to the victim UEs for performing the CLI measurement and reporting. The group common DCI received from the base station may trigger the CLI reporting by the multiple/victim UEs. A configuration for SRS transmissions 1002 may be similarly provided from the base station to the aggressor UEs based on a second technique for grouping common DCI. In some examples, aspects of the first technique and the second technique may be associated with a combined DCI grouping technique to reduce overhead. That is, the base station may configure a single group of common DCI for both triggering SRS transmissions 1002 by the aggressor UEs and triggering CLI measurement and reporting by the victim UEs.

The base station may provide a configuration for a CLI-report associated with CSI-IM resources 1004 and CLI reporting quantities, such as CLI-received signal strength indicator (CLI-RSSI), SRS-RSRP, and/or SRS-reference signal received quality (SRS-RSRQ), among other examples. Additionally, or alternatively, the base station may provide a configuration for the CLI-report based on an SRS transmission 1002 received from an aggressor UE and the CLI reporting quantities, such as CLI-RSSI, SRS-RSRP, and/or SRS-RSRQ, among other examples.

The base station may configure the aggressor UEs for different SRS resources through the common DCI such that a victim UE may report multiple RSRP/RSSI for the different SRS resources. A transmission configuration indicator (TCI) state for the CSI-IM resources 1004 may be defined by the base station that may be indicative of quasi co-location (QCL)-Type D (e.g., a spatial Rx parameter that the UE may utilize for performing the CLI measurement). In some examples, QCL-Type D may be utilized to support beamforming applications. The TCI state may be signaled to the UE similarly to transmission techniques for CSI-RS. For aperiodic CLI-reporting, the TCI state may be configured in an aperiodic trigger state. The aperiodic trigger state may include a list of TCI states associated with a CSI-IM resource set that includes multiple CSI-IM resources 1004. That is, if the report is associated with a certain resource set and the resource set includes multiple resources, each TCI state in the list of TCI states may correspond to particular resources in the resource set.

A full-duplex UE may be included in both sets of UEs (e.g., victim UEs and aggressor UEs) that receive the common DCI from the base station. Accordingly, the full-duplex UE may be configured for both aperiodic SRS transmission and CLI measurement and reporting in CSI-IM resources 1004. Since the UE may transmit and receive at a same time while operating in a full-duplex mode, the time-frequency resources may all be allocated to a UE1. For example, the UE 1 may be simultaneously transmitting UL data 1008 and receiving DL data 1006a-b such that UE1 may be both an aggressor UE and a victim UE. Thus, the common DCI may be configured to trigger both an SRS transmission 1002 and CLI measurement and reporting by UE1 at the same time.

In an example, UE1 and UE2 may be the aggressor UEs, and UE3 and UE4 may be the victim UEs. That is, UE1 and UE2 may transmit the UL data 1008 over the middle band and UE3 and UE4 may receive the DL data 1006a-b over the upper band and the lower band, respectively. The base station may transmit the common DCI to trigger SRS transmissions 1002 from UE1 and UE2 and trigger CLI measurement and reporting by UE3 and UE4 in CSI-IM resource 1004. The SRS transmissions 1002 may correspond to a right side of the middle band, and the CSI-IM resources 1004 for measuring and reporting CLI leakage may correspond to a right side of the upper/lower bands. The measurements may be reported to the base station via CLI RSRP/RSSI.

As indicated above, FIG. 10 is provided as an example. Other examples may differ from what is described with regard to FIG. 10.

FIGS. 11A and 11B illustrate DCI payloads 1100-1150 that each have a plurality of blocks. A UE may be configured to monitor for a particular block in the plurality of blocks based on a DCI position index, which may be radio resource control (RRC) configured. The DCI payload 1100 may indicate an operation that the UE is to perform. For example, if the UE is configured with a first DCI position that corresponds to a block 1, the UE may determine information included in the block 1 and perform a corresponding operation. The DCI payload 1100 may be divided into multiple blocks such that individual UEs may be configured with a respective DCI position corresponding to one of the multiple blocks. In some aspects, a same DCI position may be associated with multiple UEs. Each block may include an SRS triggering codepoint (e.g., of 2 bits), which may be indicative of an SRS transmission configuration, an optional transmit power control (TPC) command (e.g., of 2 bits), and a CLI request field for a payload of the block. The SRS triggering codepoint and the TPC command may be for aggressor UEs, and the CLI request field may be for victim UEs.

If the UE is a victim UE rather than an aggressor UE, the SRS triggering and the TPC command field may be zero and the UE may monitor for the CLI request field without monitoring for the SRS triggering codepoint or the TPC command. If the UE is an aggressor UE rather than a victim UE, the CLI request field may be zero and the UE may monitor for the SRS triggering codepoint and TPC command without monitoring for the CLI request field. If the UE is both a victim UE and an aggressor UE, the UE may monitor for all three fields (e.g., the SRS triggering codepoint, the TPC command, and the CLI request field).

The CLI request field may be used by the UE to determine which CSI-IM resources the UE may use for CLI measurements. That is, the CLI request field may indicate a CSI-IM resource set for performing the CLI measurements. In a first example, a same SRS codepoint may be used for indicating the CSI-IM when the CSI-IM matches the SRS allocation (e.g., the same SRS triggering codepoint may be used for triggering the CSI-IM). In a second example, the CLI request field may indicate a trigger state associated with the CSI-IM resource set. CSI reports and CLI reports may both use a CSI aperiodic trigger state list (e.g., a ('SI-Aperiodic-TriggerStateList) that, for example, includes a field size of $\{0, \ldots, 6\}$ bits. The field size may be RRC configured. The ('SI-AperiodicTriggerStateList may indicate trigger states to be reported by the UE. A size of the list may be determined based on a number of bits in the CLI request field (e.g., 0 to 6 bits). For instance, 6 bits may correspond to a list that includes 26 trigger states. Since the CLI request field may be used for CLI reporting, both the CSI and the CLI may share the same state list (e.g., which may be referred to as a "StateList"). In this manner, a CSI framework may be used for CLI reporting. In a third example, the CLI request field may define a separate (II-Aperiodic TriggerStateList for CLI reporting. The field size of the separate list may be $\{0, \ldots, 4\}$ bits and may be RRC configured. A trigger state for the separate list May include multiple CLI report IDs. Each CLI report ID may point to a CLI report setting that may be associated with a CSI-IM resource set and QCL-information.

In some configurations, the DCI payload 1150 may have two portions. A first portion of the payload 1150 may be indexed based on the first DCI position and a second portion of the payload 1150 may be indexed based on the second DCI position. A UE may be configured with one or more DCI positions. For example, an aggressor UE may be configured with the first DCI position (e.g., without being configured with the second DCI position), a victim UE may be configured with the second DCI position (e.g., without being configured with the first DCI position), and a UE that is both an aggressor UE and a victim UE may be configured with both the first DCI position and the second DCI position. Accordingly, the first portion of the payload 1150 (e.g., B1 blocks) may include information associated with aggressor UEs, such as SRS triggering and TPC commands. The second portion of the payload 1150 (e.g., B2 blocks) may include the indication information for a CSI-IM resource set used for CLI measurement. If two or more UEs have a same configuration, the base station may configure the two or more UEs with a same DCI position.

In some cases, the DCI that triggers aperiodical CSI (A-CSI) reporting also triggers CSI-RS/CSI-IM measurements. The triggering code point in the DCI maps to a trigger state which indicates CSI-RS/CSI-IM measurement resources. A UE receiving the DCI can determine the slot during which the UE needs to measure based on an aperiodic triggering offset parameter (e.g., the aperiodicTriggering-Offset parameter) and an RRC configuration of a non-zero power (NZP) CSI-RS resource set. However, CLI measurements are performed using CSI-IM resources, not NZP CSI-RS and the CSI-IM can be assumed to be in the same slot as CSI-RS but no timing information is generally defined for CSI-IM.

Some aspects of the techniques and apparatuses described herein may facilitate providing timing information for CSI-IM operations that coincide with A-SRS transmission from aggressor UEs. For example, in some aspects, a UE (e.g., a victim UE) may receive a GC DCI transmission that includes a CLI measurement request indication and may determine a CSI-IM during an interference measurement occasion. The interference measurement occasion may be indicated by the CLI measurement request indication. In this manner, some aspects may facilitate providing timing information associated with CSI-IM operations, and thus may result in efficiencies and/or accuracy in CSI-IM measurement and/or reporting, thereby having a positive impact on network and/or device performance.

As indicated above, FIGS. 11A and 11B are provided as examples. Other examples may differ from what is described with regard to FIGS. 11A and 11B.

Figure 12:
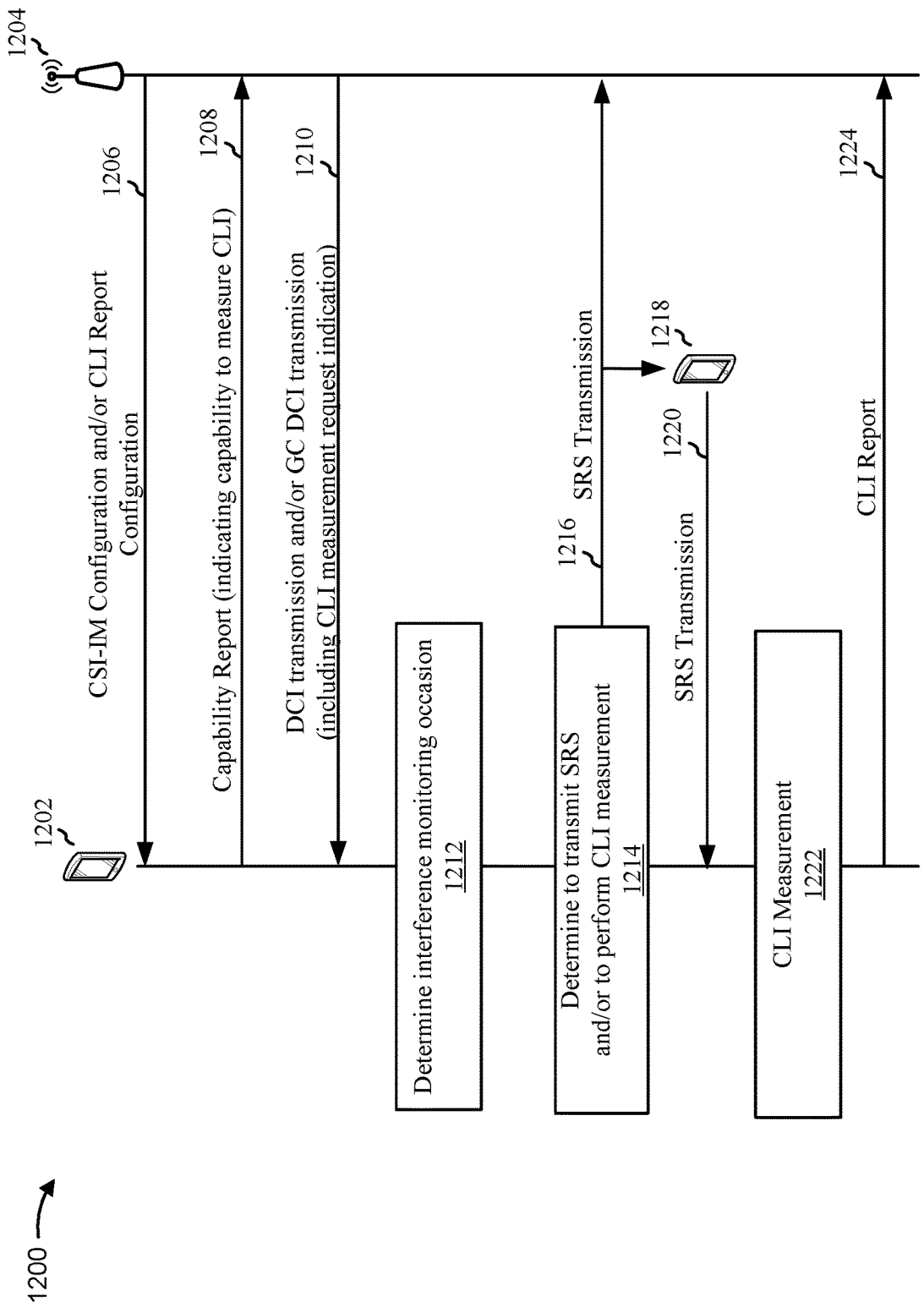

FIG. 12 is a call flow diagram 1200 illustrating an example associated with CLI reporting in full duplex communications, in accordance with the present disclosure. As shown, a first network node 1202 and a second network node 1204 may communicate with one another. The first network node 1202 may be or include, for example, a UE. The second network node 1204 may be or include, for example, a base station.

As shown by reference number 1206, the second network node 1204 may transmit, and the first network node 1202 may receive, a CSI-IM configuration and/or a CLI report configuration. In some aspects, the CSI-IM configuration may be associated with a CLI report configuration.

In some aspects, the CLI report configuration may also be referred to as a "CLI configuration" and/or a "CLI reporting configuration." The CLI report configuration may include a CSI-IM resource set configuration that indicates an aperiodic triggering offset value. The aperiodic triggering offset value may be used for determining an interference measuring slot associated with an interference measuring occasion. In some aspects, the CSI-IM resource set configuration may include information indicative of available reference slot indication values that may be used to determine a reference slot. For example, the information indicative of the available reference slot indication values may be a list of the available reference slot indication values. In some aspects, the CSI-IM resource set configuration may exclude information indicative of available reference slot indication values and, in those cases, a reference slot indication default value may be zero. In some aspects, the CLI report configuration may indicate a CLI slot offset value that may be used for determining a CLI reporting slot.

As shown by reference number 1208, the first network node 1202 may transmit, and the second network node 1204 may receive, a capability report that indicates a capability of the first network node 1202 to measure CLI. A capability report is a communication that includes capability information. As shown by reference number 1210, the second network node 1204 may transmit, and the first network node 1202 may receive, a DCI transmission and/or a GC DCI transmission. In some aspects, the second network node 1204 may transmit, and the first network node 1202 may receive, the GC DCI transmission based on transmitting the capability report.

The GC DCI may include a CLI measurement request indication that indicates that the first network node 1202 is to measure CLI. In some aspects, the GC DCI transmission may indicate a reference slot indication value corresponding to the A-SRS and the CSI-IM. In some aspects, the GC DCI may include an A-SRS request indication. The GC DCI transmission may include an SRS triggering indication that includes two bits for representing the A-SRS request indication and two bits for representing a value of a slot offset indicator value.

As shown by reference number 1212, the first network node 1202 may determine an interference monitoring occasion. In some aspects, the first network node 1202 may determine the interference measurement occasion based on the CLI measurement request indication. For example, in some aspects, the interference measurement occasion may include an interference measurement slot and the first network node 1202 may determine the interference measurement slot based on an aperiodic triggering offset value, n. For example, an aperiodic triggering offset parameter, aperiodic TriggeringOffset, may be defined in a CSI-IM resource set RRC configuration and may be assigned a value that may be used to determine the interference measurement slot. The first network node 1202 (and/or any other network node described herein) may apply an aperiodic triggering offset value n (and/or any other offset value discussed herein) in any number of different ways. For example, a network node may apply an offset value by counting the number of slots indicated by the offset value and/or determining a slot associated with a time period corresponding to the offset value, among other examples.

In some aspects, for example, an offset value may be applied with respect to one or more specified slot format. Slot formats may define half-duplex slots or full-duplex slots. For example, half-duplex slot formats provide for symbol transmission within a slot in the direction(s) of the resources within the slot in a half-duplex manner (e.g., in the uplink direction in a slot containing all uplink resources, in the downlink direction in a slot containing all downlink resources, or in one or more directions in a slot containing one or more flexible resources). A downlink plus uplink slot (also referred to herein as full-duplex or D+U slot) is a slot in which the frequency band may be used for both uplink and downlink transmissions. For example, a D+U slot May contain uplink symbols, downlink symbols, full-duplex symbols, or a combination of any or all of uplink symbols, downlink symbols, and full-duplex symbols.

In some aspects, for example, the aperiodic triggering offset value n represents n−1 slots between a reference slot and the interference measurement slot (e.g., the interference measurement slot may be the nth slot after the reference slot). The aperiodic triggering value n may, in some examples, be an integer greater than or equal to 1. In some aspects, n may equal 1; and, in such aspects, n−1 slots represents 0 slots between the reference slot and the interference measurement slot. In some aspects, n may equal 2; and, in such aspects, n−1 slots represents 1 slot between the reference slot and the interference measurement slot. In some aspects, n may equal 3; and, in such aspects, n−1 slots represents 2 slots between the reference slot and the interference measurement slot. In some aspects, n may equal any integer greater than or equal to 1. In some aspects, for example, the first network node 1202 may determine the interference measurement slot based on determining a count of n slots forward in time from the reference slot. In some aspects, the first network node 1202 may determine the count of n slots based on identifying the n−1 slots between the reference slot and the interference measurement slot. In some aspects, the first network node 1202 may determine the count of n slots based on a time period corresponding to the n−1 slots between the reference slot and the interference measurement slot. The reference slot may include a slot during which the first network node 1202 receives the GC DCI transmission. In some aspects, the reference slot may be a slot used by another network node (e.g., a third network node) to determine a slot for transmitting an A-SRS for CLI.

The n−1 slots between the reference slot and the interference measurement slot may include all slots between the reference slot and the interference measurement slot. For example, the first network node 1202 may determine the interference measurement slot based on determining a count of all n slots after the reference slot in accordance with the aperiodic triggering offset value. The n−1 slots between the reference slot and the interference measurement slot may include only at least one of the first n−1 slots after the reference slot in which one or more uplink resources are capable of occurring and that have one or more flexible resources, or that are designated as downlink plus uplink (D+U) slots. Slots in which one or more uplink resources are capable of occurring may include, for example, uplink (U) slots, special(S) slots, flexible (F) slots, and/or D+U slots. As the term is used herein, a "flexible slot" is a slot that has only flexible resources (e.g., symbols). A flexible resource is a resource that may be configured to be an uplink resource or a downlink resource, such as an uplink symbol or a downlink symbol. As the term is used herein, a "special slot" is a slot that has at least one flexible resource and at least one uplink or downlink resource.

For example, in some aspects, the first network node 1202 may determine the interference measurement slot based on determining a count of the first n slots after the reference slot in which one or more uplink resources are capable of occurring and that have one or more flexible resources. In some aspects, the first network node 1202 may determine the interference measurement slot based on determining a count of the first n slots after the reference slot that are designated as D+U slots. In some aspects the first network node 1202 may determine the interference measurement slot based on determining a count of the first n slots after the reference slot that either are designated as downlink plus uplink slots, or are slots in which one or more uplink resources are capable of occurring and that have one or more flexible resources.

The n−1 slots between the reference slot and the interference measurement slot may include only at least one of the first n−1 slots after the reference slot in which one or more downlink resources are capable of occurring and that have one or more flexible resources, or that are designated as D+U slots. In some aspects, for example, slots in which one or more downlink resources are capable of occurring may include downlink (D) slots, S slots, F slots, and/or D+U slots. In some aspects, the first network node 1202 may determine the interference measurement slot based on determining a count of the first n slots after the reference slot in which one or more downlink resources are capable of occurring and that have one or more flexible resources. In some aspects, the first network node 1202 may determine the interference measurement slot based on determining a count of the first n slots after the reference slot that are designated as D+U slots. In some aspects the first network node 1202 may determine the interference measurement slot based on determining a count of the first n slots after the reference slot that either are designated as downlink plus uplink slots or are slots in which one or more downlink resources are capable of occurring and that have one or more flexible resources. The n−1 slots between the reference slot and the interference measurement slot may be the first n−1 slots after the reference slot in which intra-cell crosslink interference is capable of occurring. In some aspects, for example, the first network node 1202 may determine the interference measurement slot based on determining a count of the first n slots after the reference slot in which intra-cell crosslink interference is capable of occurring.

In some aspects, the CSI-IM configuration may include information indicative of available reference slot indication values. For example, the CSI-IM configuration may include a CSI-IM resource set configuration that indicates the available reference slot indication values ("t" values) and the CLI measurement request indication may indicate a first reference slot indication value of the available reference slot indication values. The first reference slot indication value may be referred to a "selected reference slot indication value." In some aspects, the CSI-IM configuration may exclude information indicative of available reference slot indication values, in which case, a reference slot indication default value may be zero.

As shown by reference number 1214, the first network node 1202 may determine, based on the DCI and/or GC DCI transmission, to transmit A-SRS and/or perform a CLI measurement in the CSI-IM resources. As shown by reference number 1216, the first network node 1202 may transmit the SRS transmission. The SRS transmission may be received by the second network node 1204 or by a third network node 1218 in the group of network nodes. In some aspects, transmitting the SRS may include transmitting the SRS in an SRS transmission slot. In some aspects, the SRS transmission slot may be the reference slot described above. The SRS transmission slot may include a slot based on a slot offset following a slot offset field in an SRS resource set configuration. In some aspects, a first reference slot offset value may represent where a first reference slot is relative to a second reference slot, and a second slot offset value may represent where the SRS transmission slot is relative to the first reference slot, where the first reference slot is between the second reference slot and the SRS transmission slot. For example, the second slot offset value may represent n−1 slots between the first reference slot and the SRS transmission slot, where n is the second slot offset value. The first reference slot may be a slot forward of the second reference slot based at least in part on a first reference slot offset value, t.

The first reference slot offset value/may be semi-statically signaled (e.g., via RRC signaling and/or medium access control (MAC) control element (MAC-CE) signaling). In some aspects, the first reference slot offset value may be two bits in length. The second reference slot may be a slot in which a DCI transmission is received (e.g., a GC DCI transmission). The second slot offset value (which may, in some aspects, be indicated using a parameter, slotoffset) may be dynamically signaled (e.g., via DCI signaling). In some aspects, the first network node 1202 may receive RRC signaling or MAC-CE signaling, where the RRC signaling or MAC-CE signaling includes information indicative of available reference slot offset values. In some aspects, the first network node 1202 may receive a flexible A-SRS configuration that indicates available reference slot offset values (including the first reference slot offset value) and the A-SRS request indication may indicate the first (e.g., selected) reference slot offset value of the available reference slot offset values.

As shown by reference number 1220, the first network node 1202 may receive an SRS transmission from a subset of network nodes (e.g., the third network node 1218) included in the group of network nodes. As shown by reference number 1222, the first network node 1202 may perform the CLI measurement in the CSI-IM resources.

As shown by reference number 1224, the first network node 1202 may transmit, and the second network node 1204 may receive, a CLI report. The term "CLI report" refers to a communication that includes CLI. In some aspects, the CLI report may include at least one of an RSSI, an RSRP, or an RSRQ. In some aspects, the CLI report may be included in a CSI report.

In some aspects, transmitting the CLI report may include transmitting the CLI report during a reporting slot based at least in part a CLI slot offset value. In some aspects, the first network node 1202 may determine that the first network node 1202 is scheduled to transmit a PUSCH communication during the reporting slot. The first network node 1202 may transmit the CLI report by multiplexing the CLI report with a PUSCH communication on the PUSCH. In some aspects, the reporting slot may include a slot in which the first network node 1202 is scheduled to transmit a PUSCH that carries at least one of uplink control information or uplink shared channel data.

In some aspects, the first network node 1202 may determine a slot the value of the CLI slot offset value based on a maximum of a CLI offset value indicated by a CLI reporting configuration or a slot associated with a next scheduled PUSCH transmission. In some aspects, for example, the second network node 1204 may transmit, and the first network node 1202 may receive, an uplink scheduling DCI that indicates a PUSCH allocation that indicates the next scheduled PUSCH transmission.

The CSI slot offset value may represent n−1 slots between a reference slot and a reporting slot, where n is the CSI slot offset value. In some aspects, the first network node 1202 may determine a reporting slot based on a reference slot and a count of n slots forward in time from the reference slot in accordance with the CLI slot offset value. In some aspects, the reference slot may include a slot in which the first network node 1202 receives a GC DCI transmission. In some aspects, the reference slot May include a slot in which one or more interference measurement resources are allocated. The n−1 slots between the reference slot and the reporting slot may include all slots between the reference slot and the reporting slot. In some aspects, the count of n slots may include a count of all slots between the reference slot and the reporting slot. The n-I slots between the reference slot and the reporting slot may be the first n−1 slots after the reference slot in which one or more uplink resources are capable of occurring. In some aspects, for example, the count of n slots may include a count of all slots between the reference slot and the reporting slot in which one or more uplink resources are capable of occurring.

As indicated above, FIG. 12 is provided as an example. Other examples may differ from what is described with regard to FIG. 12.

FIGS. 13A and 13B are block diagrams illustrating examples 1300 and 1350 associated with CLI reporting in full duplex communications, in accordance with the present disclosure. As shown, examples 1300 and 1350 illustrate DCI payloads similar to the DCI payloads 1100 and 1150, respectively.

FIG. 13A further illustrates an example 1320 of a block structure associated with an implementation in which a one-part GC DCI transmission includes a dedicated slot indication value field ("t"), an SRS request field, a TPC field, and a CLI request field. If a network node receiving the DCI is a victim (e.g., the SRS field is 0), the network node may decode the CLI field and the dedicated slot indication value field. Similarly, if the network node is an aggressor (e.g., the CLI request field is 0), the network node may decode the SRS request field and the dedicated slot indication value field. In some aspects, the one-part GC DCI may be used to implement a first reference slot offset following a second slot offset field in an SRS resource set RRC configuration. A one-part GC DCI may be a GC DCI that includes only one block of data fields. FIG. 13B further illustrates examples 1360 and 1370 of block structures associated with a two-part GC DCI transmission that includes a first block corresponding to an SRS request and a second block corresponding to a CLI request field. Both blocks include dedicated slot indication value fields. In some aspects, example 1350 may be an indication of a configuration that supports A-SRS flexible triggering. For example, a network node may receive an RRC configuration of available reference slot "t" values and may receive a GC DCI transmission including an indication of one of these "t" values. SRS triggering may include 2 bits for the SRS request field and, optionally, 2 bits for indicating the "(" value.

As indicated above, FIGS. 13A and 13B are provided as examples. Other examples may differ from what is described with regard to FIGS. 13A and 13B.

Figure 14A:
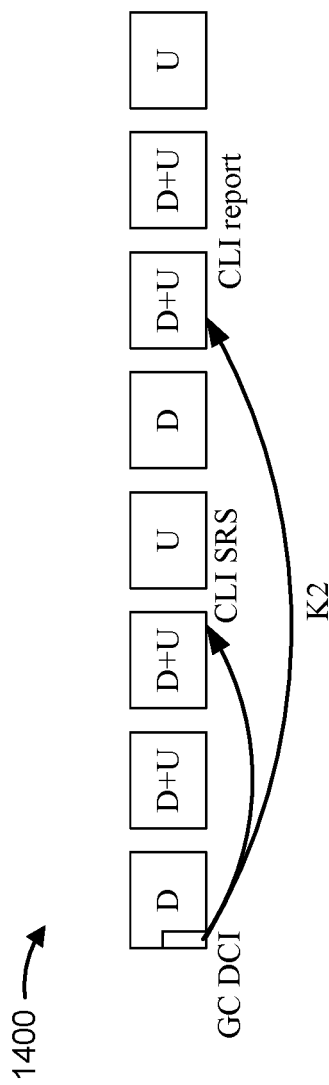
Figure 14B:
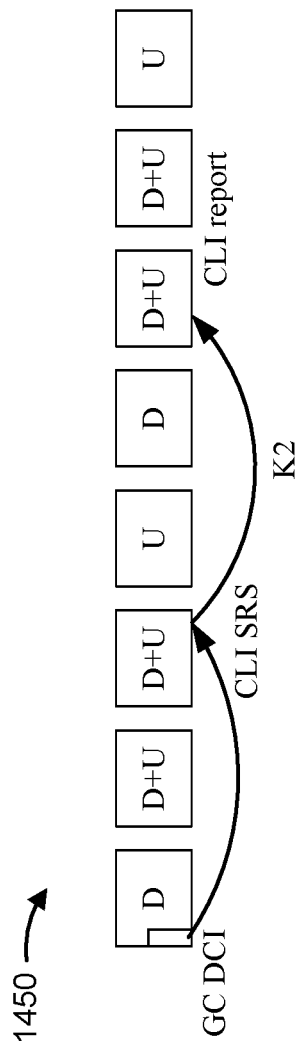

FIGS. 14A and 14B are block diagrams illustrating examples 1400 and 1450 associated with CLI reporting in full duplex communications, in accordance with the present disclosure. As shown, examples 1400 and 1450 illustrate examples of counting slots according to a slot offset indicator (K2) value n. For example, the slot offset indicator K2 may be a parameter that indicates a value n, as described above. As shown, example 1400 illustrates an aspect in which K2=5, and all of the slots after the reference slot are counted. In example 1400, the reference slot is the slot in which the network node receives the GC DCI transmission. Example 1400 also may illustrate a situation in which K2=4 and in which the network node counts slots from the reference slot that include uplink resources. Example 1450 illustrates an aspect in which K2=3 and in which all slots are counted from the reference slot, which, in example 1450, is a slot in which the network node is allocated measurement resources.

As indicated above, FIGS. 14A and 14B are provided as examples. Other examples may differ from what is described with regard to FIGS. 14A and 14B.

FIG. 15 is a diagram illustrating an example process 1500 performed, for example, by a first network node, in accordance with the present disclosure. Example process 1500 is an example where the first network node (e.g., first network node 1202) performs operations associated with cross-link interference reporting in full duplex.

As shown in FIG. 15, in some aspects, process 1500 may include receiving a GC DCI transmission comprising a CLI measurement request indication (block 1510). For example, the first network node (e.g., using communication manager 140 and/or reception component 2102, depicted in FIG. 21) may receive a GC DCI transmission comprising a CLI measurement request indication, as described above.

As further shown in FIG. 15, in some aspects, process 1500 may include determining a CSI-IM during an interference measurement occasion, wherein the interference measurement occasion is indicated by the CLI measurement request indication (block 1520). For example, the first network node (e.g., using communication manager 140 and/or determination component 2108, depicted in FIG. 21) may determine a CSI-IM during an interference measurement occasion, wherein the interference measurement occasion is indicated by the CLI measurement request indication, as described above.

Process 1500 may include additional aspects, such as any single aspect or any combination of aspects described below and/or in connection with one or more other processes described elsewhere herein.

In a first aspect, process 1500 includes determining the interference measurement occasion based on the CLI measurement request indication.

In a second aspect, alone or in combination with the first aspect, the interference measurement occasion comprises an interference measurement slot, and process 1500 further includes determining the interference measurement slot based on an aperiodic triggering offset value. In a third aspect, alone or in combination with the second aspect, process 1500 includes receiving a CSI-IM configuration that includes information indicative of the aperiodic triggering offset value. In a fourth aspect, alone or in combination with the third aspect, the information indicative of the aperiodic triggering offset value comprises a CSI-IM resource set configuration.

In a fifth aspect, alone or in combination with one or more of the third or fourth aspects, the aperiodic triggering offset value represents n−1 slots between a reference slot and the interference measurement slot, wherein n is the aperiodic triggering offset value. In a sixth aspect, alone or in combination with the fifth aspect, process 1500 includes receiving the GC DCI transmission in the reference slot. In a seventh aspect, alone or in combination with one or more of the fifth or sixth aspects, the n−1 slots between the reference slot and the interference measurement slot include all slots between the reference slot and the interference measurement slot. In an eighth aspect, alone or in combination with one or more of the fifth or sixth aspects, the n−1 slots between the reference slot and the interference measurement slot include only at least one of one or more slots in which one or more uplink resources are capable of occurring and that have one or more flexible resources, or one or more slots designated as D+U slots.

In a ninth aspect, alone or in combination with one or more of the fifth or sixth aspects, the n−1 slots between the reference slot and the interference measurement slot include only at least one of one or more slots in which one or more downlink resources are capable of occurring and that have one or more flexible resources, or one or more slots designated as D+U slots. In a tenth aspect, alone or in combination with one or more of the fifth or sixth aspects, the n−1 slots between the reference slot and the interference measurement slot are slots in which intra-cell crosslink interference is capable of occurring.

In an eleventh aspect, alone or in combination with one or more of the fifth through tenth aspects, process 1500 includes receiving a CSI-IM configuration that includes information indicative of available reference slot indication values. In a twelfth aspect, alone or in combination with the eleventh aspect, the CLI measurement request indication indicates a first reference slot indication value of the available reference slot indication values. The available reference slot indication values may be available reference slot offset values. In a thirteenth aspect, alone or in combination with the fifth aspect, process 1500 includes receiving a CSI-IM configuration that excludes information indicative of available reference slot indication values, wherein a reference slot indication default value is zero.

In a fourteenth aspect, alone or in combination with one or more of the fifth through thirteenth aspects, process 1500 includes receiving, from a second network node, an A-SRS in the reference slot. In a fifteenth aspect, alone or in combination with the fourteenth aspect, the GC DCI transmission indicates a reference slot indication value corresponding to the A-SRS and the interference measurement occasion.

In a sixteenth aspect, alone or in combination with the fifteenth aspect, the GC DCI transmission comprises a one-part GC DCI transmission that includes a dedicated slot indication value field, including first information. In a seventeenth aspect, alone or in combination with the sixteenth aspect, the GC DCI transmission includes an SRS request field and a CLI request field including second information, and process 1500 includes decoding the dedicated slot indication value field and the CLI request field. In an eighteenth aspect, alone or in combination with the seventeenth aspect, process 1500 includes using the first information and the second information for determining the interference measurement occasion. In a nineteenth aspect, alone or in combination with one or more of the fifteenth through eighteenth aspects, the GC DCI transmission comprises a two-part GC DCI transmission comprising a first block corresponding to an SRS request and a second block corresponding to a CLI request field, and process 1500 includes decoding the second block.

In a twentieth aspect, alone or in combination with one or more of the first through nineteenth aspects, process 1500 includes transmitting capability information that indicates a capability of the first network node to measure CLI, wherein receiving the GC DCI transmission comprises receiving the GC DCI transmission based on transmitting the capability information.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
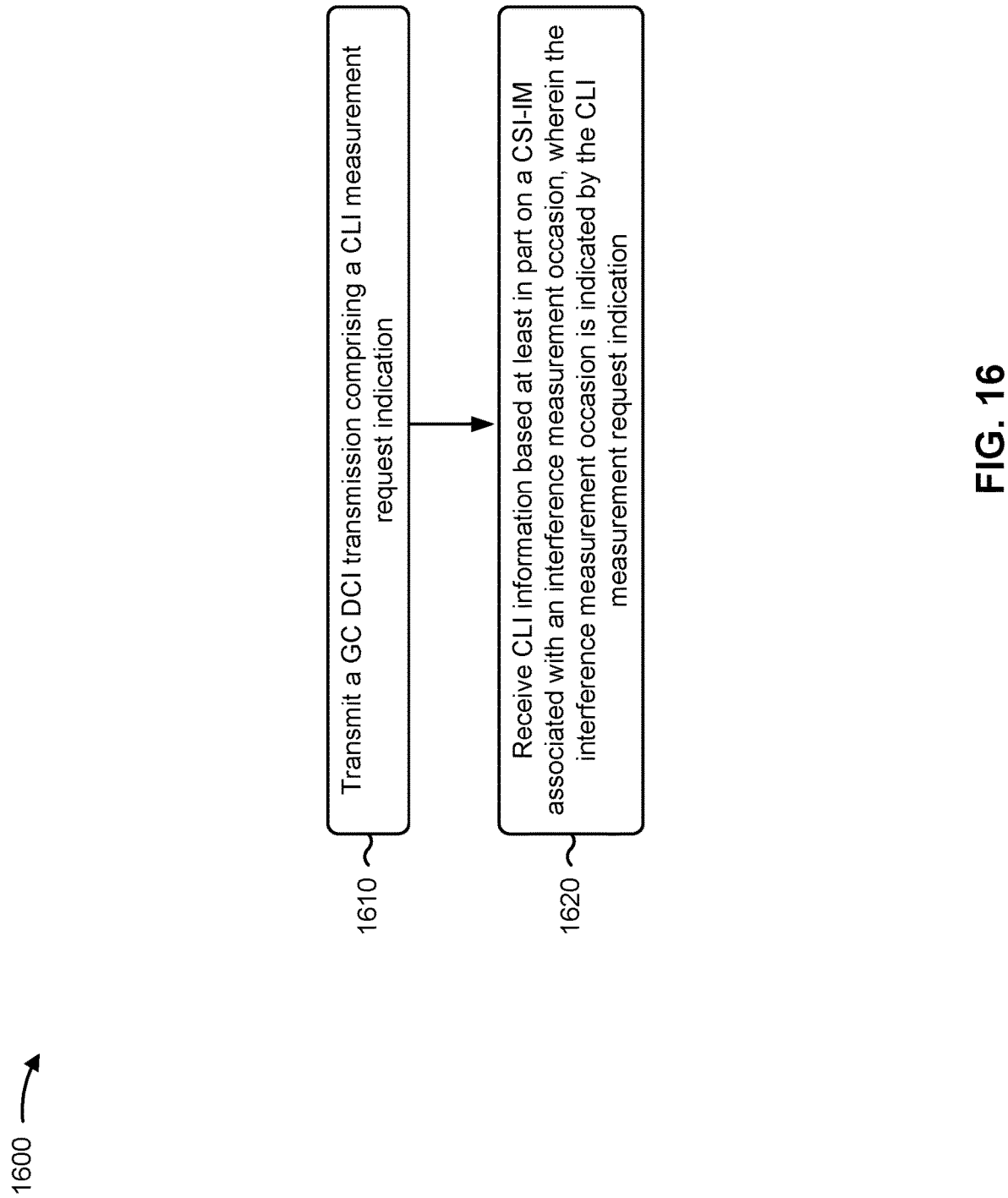

FIG. 16 is a diagram illustrating an example process 1600 performed, for example, by a first network node, in accordance with the present disclosure. Example process 1600 is an example where a first network node (e.g., the second network node 1204) performs operations associated with cross-link interference reporting in full duplex.

As shown in FIG. 16, in some aspects, process 1600 may include transmitting a GC DCI transmission comprising a CLI measurement request indication (block 1610). For example, the first network node (e.g., using communication manager 150 and/or transmission component 2204, depicted in FIG. 22) may transmit a GC DCI transmission comprising a CLI measurement request indication, as described above.

As further shown in FIG. 16, in some aspects, process 1600 may include receiving CLI information based on a CSI-IM associated with an interference measurement occasion, wherein the interference measurement occasion is indicated by the CLI measurement request indication (block 1620). For example, the first network node (e.g., using communication manager 150 and/or reception component 2202, depicted in FIG. 22) may receive CLI information based on a CSI-IM associated with an interference measurement occasion, wherein the interference measurement occasion is indicated by the CLI measurement request indication, as described above.

Process 1600 may include additional aspects, such as any single aspect or any combination of aspects described below and/or in connection with one or more other processes described elsewhere herein.

In a first aspect, the interference measurement occasion is based on the CLI measurement request indication. In a second aspect, alone or in combination with the first aspect, the interference measurement occasion comprises an interference measurement slot, and the interference measurement slot is based on an aperiodic triggering offset value. In a third aspect, alone or in combination with the second aspect, process 1600 includes transmitting a CSI-IM configuration that includes information indicative of the aperiodic triggering offset value. In a fourth aspect, alone or in combination with the third aspect, the information indicative of the aperiodic triggering offset value comprises a CSI-IM resource set configuration.

In a fifth aspect, alone or in combination with one or more of the second through fourth aspects, the aperiodic triggering offset value represents n−1 slots between a reference slot and the interference measurement slot, wherein n is the aperiodic triggering offset value. In a sixth aspect, alone or in combination with the fifth aspect, process 1600 includes transmitting the GC DCI transmission in the reference slot. In a seventh aspect, alone or in combination with one or more of the fifth or sixth aspects, the n−1 slots between the reference slot and the interference measurement slot include all slots between the reference slot and the interference measurement slot.

In an eighth aspect, alone or in combination with one or more of the fifth or sixth aspects, the n−1 slots between the reference slot and the interference measurement slot include only at least one of one or more slots in which one or more uplink resources are capable of occurring and that have one or more flexible resources, or one or more slots designated as D+_U slots. In a ninth aspect, alone or in combination with one or more of the fifth or sixth aspects, the n−1 slots between the reference slot and the interference measurement slot include only at least one of one or more slots in which one or more downlink resources are capable of occurring and that have one or more flexible resources, or one or more slots designated as downlink plus uplink slots. In a tenth aspect, alone or in combination with one or more of the fifth or sixth aspects, the n−1 slots between the reference slot and the interference measurement slot are slots in which intra-cell crosslink interference is capable of occurring.

In an eleventh aspect, alone or in combination with one or more of the fifth through tenth aspects, process 1600 includes transmitting a CSI-IM configuration that includes information indicative of available reference slot indication values. In a twelfth aspect, alone or in combination with the eleventh aspect, the CLI measurement request indication indicates a first reference slot indication value of the available reference slot indication values. In a thirteenth aspect, alone or in combination with the twelfth aspect, process 1600 includes transmitting a CSI-IM configuration that excludes information indicative of available reference slot indication values, wherein a reference slot indication default value is zero.

In a fourteenth aspect, alone or in combination with one or more of the fifth through fourteenth aspects, process 1600 includes scheduling, in the reference slot, transmission of an A-SRS by a second network node. In a fifteenth aspect, alone or in combination with the fourteenth aspect, the GC DCI transmission indicates a reference slot indication value corresponding to the A-SRS and the interference measurement occasion. In a sixteenth aspect, alone or in combination with the fifteenth aspect, the GC DCI transmission comprises a one-part GC DCI transmission that includes a dedicated slot indication value field including first information. In a seventeenth aspect, alone or in combination with the sixteenth aspect, the GC DCI transmission includes an SRS request field and a CLI request field including second information.

In an eighteenth aspect, alone or in combination with one or more of the fourteenth through seventeenth aspects, the GC DCI transmission comprises a two-part GC DCI transmission comprising a first block corresponding to an SRS request and a second block corresponding to a CLI request field.

In a nineteenth aspect, alone or in combination with one or more of the first through eighteenth aspects, process 1600 includes receiving capability information that indicates a capability of the first network node to measure CLI, wherein transmitting the GC DCI transmission comprises transmitting the GC DCI transmission based on receiving the capability information.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
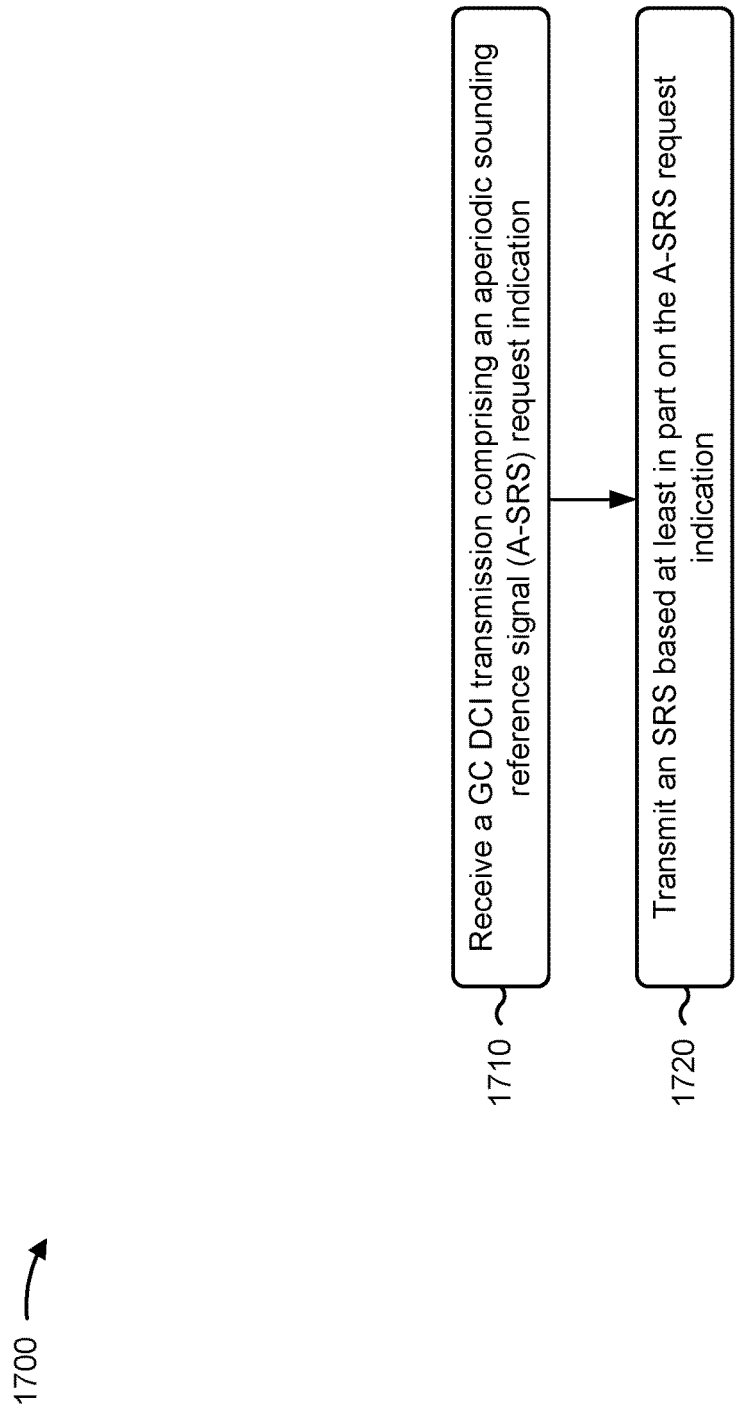

FIG. 17 is a diagram illustrating an example process 1700 performed, for example, by a network node, in accordance with the present disclosure. Example process 1700 is an example where the network node (e.g., network node 1202) performs operations associated with cross-link interference reporting in full duplex.

As shown in FIG. 17, in some aspects, process 1700 may include receiving a GC DCI transmission comprising an A-SRS request indication (block 1710). For example, the network node (e.g., using communication manager 140 and/or reception component 2102, depicted in FIG. 21) may receive a GC DCI transmission comprising an A-SRS request indication, as described above.

As further shown in FIG. 17, in some aspects, process 1700 may include transmitting an SRS based on the A-SRS request indication (block 1720). For example, the network node (e.g., using communication manager 140 and/or transmission component 2104, depicted in FIG. 21) may transmit an SRS based on the A-SRS request indication, as described above.

Process 1700 may include additional aspects, such as any single aspect or any combination of aspects described below and/or in connection with one or more other processes described elsewhere herein.

In a first aspect, transmitting the SRS comprises transmitting the SRS in an SRS transmission slot. In a second aspect, alone or in combination with the first aspect, a first reference slot offset value represents where a first reference slot is relative to a second reference slot, and a second slot offset value represents where the SRS transmission slot is relative to the first reference slot, wherein the first reference slot is between the second reference slot and the SRS transmission slot.

In a third aspect, alone or in combination with one or more of the first and second aspects, process 1700 includes receiving RRC signaling or MAC-CE signaling, wherein the RRC signaling or the MAC-CE signaling includes information indicative of available reference slot offset values, wherein the available reference slot offset values include the first reference slot offset value, and wherein the A-SRS request indication indicates the first reference slot offset value. In a fourth aspect, alone or in combination with one or more of the first through third aspects, the first reference slot offset value is two bits in length.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
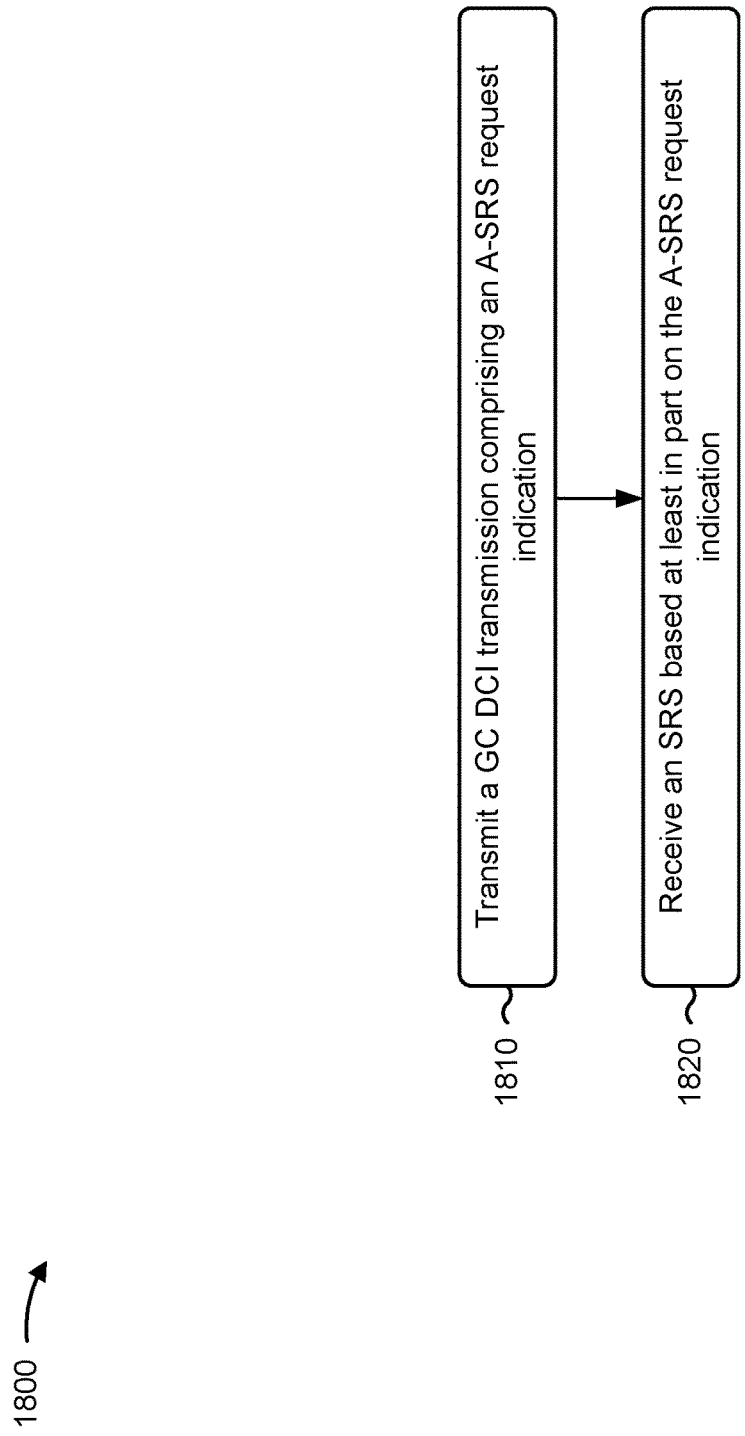

FIG. 18 is a diagram illustrating an example process 1800 performed, for example, by a network node, in accordance with the present disclosure. Example process 1800 is an example where the network node (e.g., network node 1204) performs operations associated with cross-link interference reporting in full duplex.

As shown in FIG. 18, in some aspects, process 1800 may include transmitting a GC DCI transmission comprising an A-SRS request indication (block 1810). For example, the network node (e.g., using communication manager 150 and/or transmission component 2204, depicted in FIG. 22) may transmit a GC DCI transmission comprising an A-SRS request indication, as described above.

As further shown in FIG. 18, in some aspects, process 1800 may include receiving an SRS based on the A-SRS request indication (block 1820). For example, the network node (e.g., using communication manager 150 and/or reception component 2202, depicted in FIG. 22) may receive an SRS based on the A-SRS request indication, as described above.

Process 1800 may include additional aspects, such as any single aspect or any combination of aspects described below and/or in connection with one or more other processes described elsewhere herein.

In a first aspect, receiving the SRS comprises receiving the SRS in an SRS transmission slot. In a second aspect, alone or in combination with the first aspect, a first reference slot offset value represents where a first reference slot is relative to a second reference slot, and a second slot offset value represents where the SRS transmission slot is relative to the first reference slot, wherein the first reference slot is between the second reference slot and the SRS transmission slot.

In a third aspect, alone or in combination with one or more of the first and second aspects, process 1800 includes transmitting RRC signaling or MAC-CE signaling, wherein the RRC signaling or the MAC-CE signaling includes information indicative of available reference slot offset values, wherein the available reference slot offset values include the first reference slot offset value, and wherein the A-SRS request indication indicates the first reference slot offset value. In a fourth aspect, alone or in combination with one or more of the first through third aspects, the first reference slot offset value is two bits in length.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
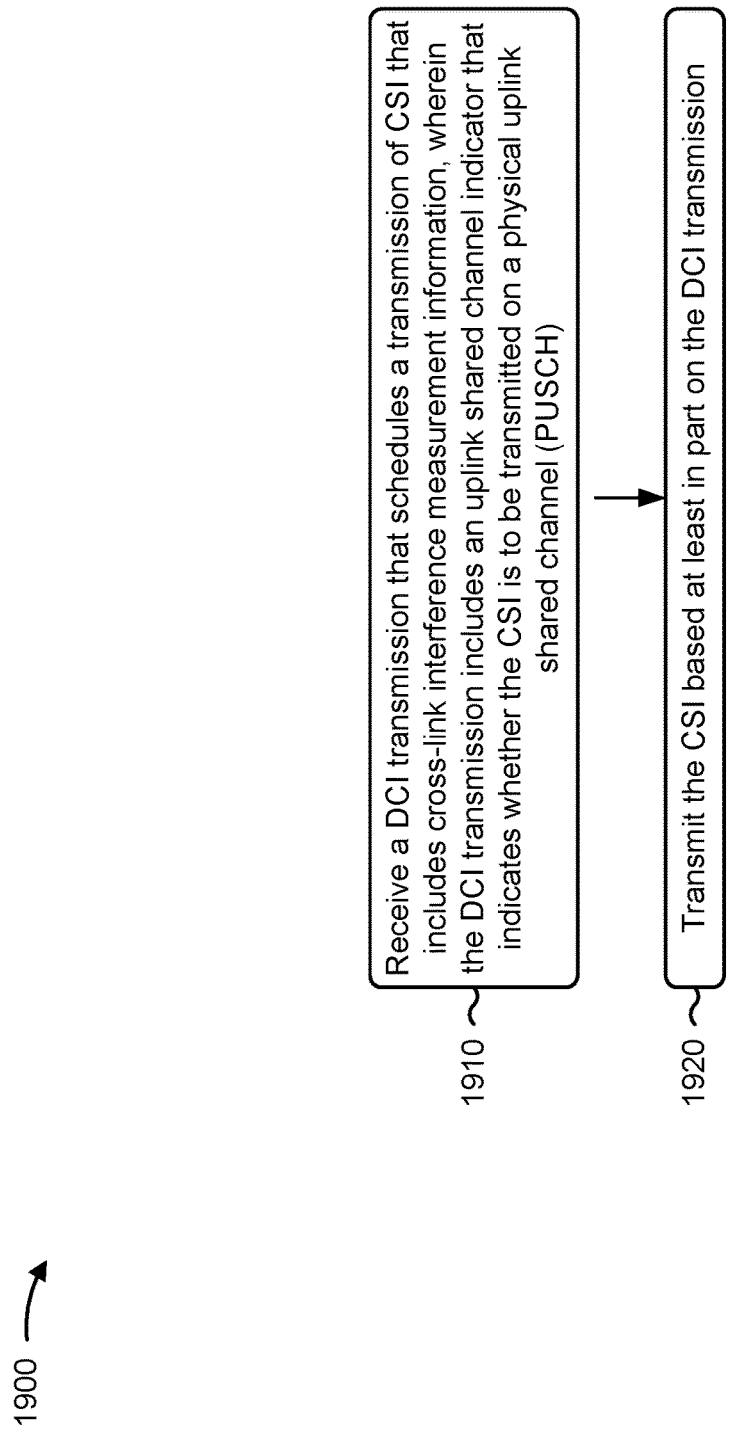

FIG. 19 is a diagram illustrating an example process 1900 performed, for example, by a network node, in accordance with the present disclosure. Example process 1900 is an example where the network node (e.g., network node 1202) performs operations associated with cross-link interference reporting in full duplex.

As shown in FIG. 19, in some aspects, process 1900 may include receiving a DCI transmission that schedules a transmission of CSI that includes cross-link interference measurement information, wherein the DCI transmission includes an uplink shared channel indicator that indicates whether the CSI is to be transmitted on a PUSCH (block 1910). For example, the network node (e.g., using communication manager 140 and/or reception component 2102, depicted in FIG. 21) may receive a DCI transmission that schedules a transmission of CSI that includes cross-link interference measurement information, wherein the DCI transmission includes an uplink shared channel indicator that indicates whether the CSI is to be transmitted on a PUSCH, as described above.

As further shown in FIG. 19, in some aspects, process 1900 may include transmitting the CSI based on the DCI transmission (block 1920). For example, the network node (e.g., using communication manager 140 and/or transmission component 2104, depicted in FIG. 21) may transmit the CSI based on the DCI transmission, as described above.

Process 1900 may include additional aspects, such as any single aspect or any combination of aspects described below and/or in connection with one or more other processes described elsewhere herein.

In a first aspect, transmitting the CSI comprises transmitting a transport block on the PUSCH based on the uplink shared channel indicator having a first value of a set of two values, wherein the transport block includes the CSI report, or transmitting the CSI on the PUSCH without a transport block based on the shared uplink channel indicator having a second value of the set of two values.

In a second aspect, alone or in combination with the first aspect, process 1900 includes receiving a PUSCH configuration that indicates at least one of a CSI slot offset value, a start and length indicator value, or a PUSCH mapping type. In a third aspect, alone or in combination with one or more of the first and second aspects, process 1900 includes receiving a CSI configuration that indicates a CSI slot offset value. In a fourth aspect, alone or in combination with one or more of the first through third aspects, transmitting the CSI comprises transmitting the CSI in a reporting slot based on a CSI slot offset value.

In a fifth aspect, alone or in combination with the fourth aspect, transmitting the CSI comprises multiplexing the CSI with a PUSCH communication based on the PUSCH communication being scheduled to be transmitted in the reporting slot. In a sixth aspect, alone or in combination with one or more of the fourth or fifth aspects, process 1900 includes receiving a PUSCH allocation to be used to transmit the CSI, wherein transmitting the CSI comprises transmitting the CSI according to the PUSCH allocation. In a seventh aspect, alone or in combination with one or more of the fourth through sixth aspects, process 1900 includes receiving scheduling information indicative of a PUSCH communication scheduled for the reporting slot, wherein the PUSCH communication includes at least one of uplink control information or uplink shared channel data.

In an eighth aspect, alone or in combination with one or more of the fourth through seventh aspects, the value of the CSI slot offset value is based on a slot represented by a maximum of a CSI offset value indicated by a CLI reporting configuration or a slot associated with a next scheduled PUSCH transmission. In a ninth aspect, alone or in combination with the eighth aspect, process 1900 includes receiving an uplink scheduling DCI including a PUSCH allocation that indicates the next scheduled PUSCH transmission.

In a tenth aspect, alone or in combination with one or more of the first through ninth aspects, the CSI offset value represents n−1 slots between a reference slot and a reporting slot, wherein n is the CSI offset value. In an eleventh aspect, alone or in combination with the tenth aspect, process 1900 includes receiving a GC DCI transmission in the reference slot. In a twelfth aspect, alone or in combination with one or more of the tenth through eleventh aspects, one or more interference measurement resources are allocated for the reference slot. In a thirteenth aspect, alone or in combination with one or more of the tenth through twelfth aspects, the n−1 slots between the reference slot and the reporting slot include all slots between the reference slot and the reporting slot. In a fourteenth aspect, alone or in combination with one or more of the tenth through thirteenth aspects, the n−1 slots between the reference slot and the reporting slot include one or more slots in which one or more uplink resources are capable of occurring.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
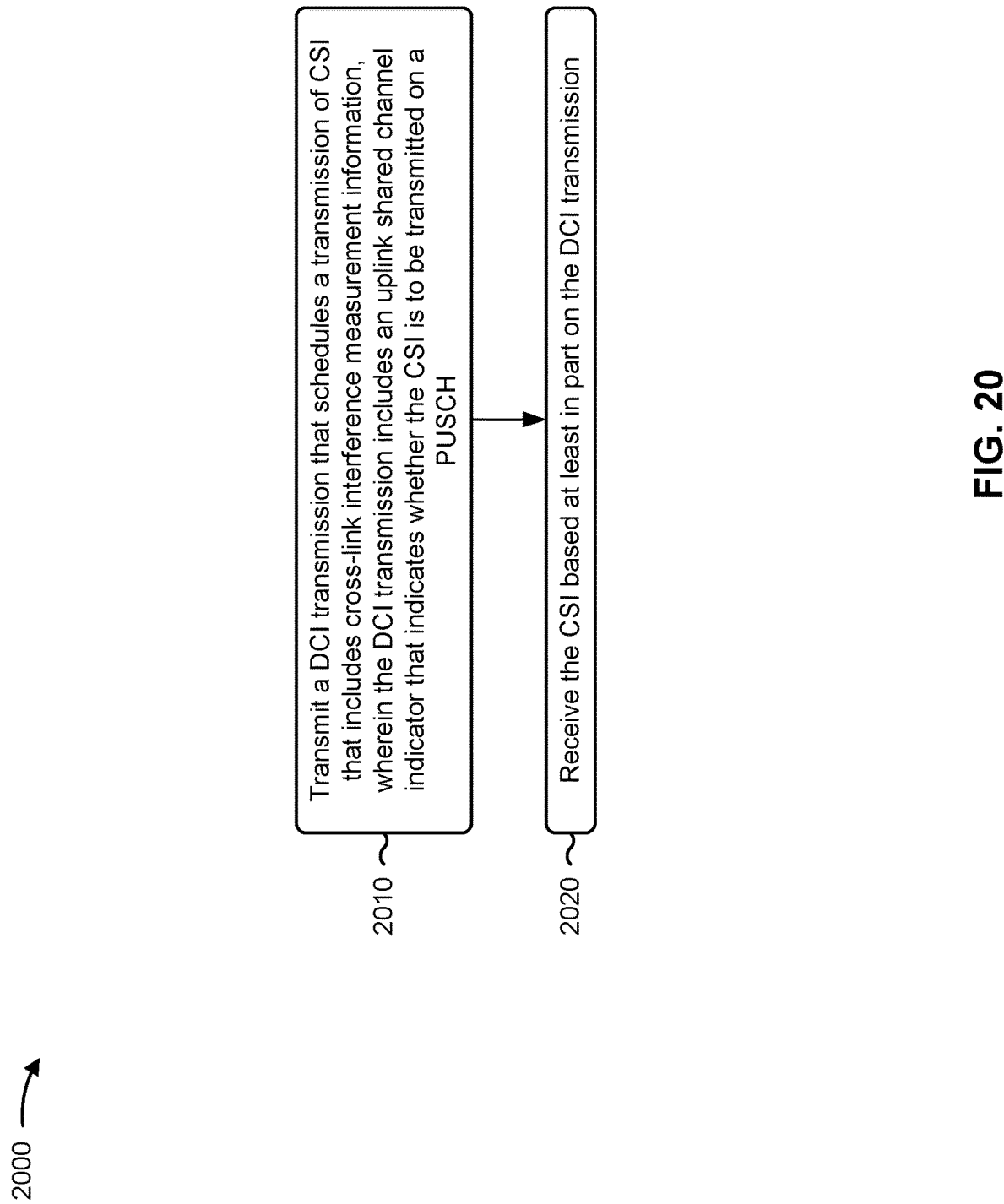

FIG. 20 is a diagram illustrating an example process 2000 performed, for example, by a network node, in accordance with the present disclosure. Example process 2000 is an example where the network node (e.g., network node 1204) performs operations associated with cross-link interference reporting in full duplex.

As shown in FIG. 20, in some aspects, process 2000 may include transmitting a DCI transmission that schedules a transmission of CSI that includes cross-link interference measurement information, wherein the DCI transmission includes an uplink shared channel indicator that indicates whether the CSI is to be transmitted on a PUSCH (block 2010). For example, the network node (e.g., using communication manager 150 and/or transmission component 2204, depicted in FIG. 22) may transmit a DCI transmission that schedules a transmission of CSI that includes cross-link interference measurement information, wherein the DCI transmission includes an uplink shared channel indicator that indicates whether the CSI is to be transmitted on a PUSCH, as described above.

As further shown in FIG. 20, in some aspects, process 2000 may include receiving the CSI based on the DCI transmission (block 2020). For example, the network node (e.g., using communication manager 150 and/or reception component 2202, depicted in FIG. 22) may receive the CSI based on the DCI transmission, as described above.

Process 2000 may include additional aspects, such as any single aspect or any combination of aspects described below and/or in connection with one or more other processes described elsewhere herein.

In a first aspect, the uplink shared channel indicator has a first value of a set of two values, and receiving the CSI comprises receiving a transport block on the PUSCH based on the uplink shared channel indicator having a first value of a set of two values, wherein the transport block includes the CSI, or receiving the CSI on the PUSCH without a transport block based on the shared uplink channel indicator having a second value of the set of two values.

In a second aspect, alone or in combination with the first aspect, process 2000 includes transmitting a PUSCH configuration that indicates at least one of a CSI slot offset value, a start and length indicator value, or a PUSCH mapping type. In a third aspect, alone or in combination with one or more of the first and second aspects, process 2000 includes transmitting a CSI configuration that indicates a CSI slot offset value. In a fourth aspect, alone or in combination with one or more of the first through third aspects, receiving the CSI comprises receiving the CSI in a reporting slot based at least in part a CSI slot offset value.

In a fifth aspect, alone or in combination with the fourth aspect, the CSI is multiplexed on the PUSCH. In a sixth aspect, alone or in combination with one or more of the fourth or fifth aspects, process 2000 includes transmitting a PUSCH allocation to be used to transmit the CSI, wherein receiving the CSI comprises receiving the CSI according to the PUSCH allocation. In a seventh aspect, alone or in combination with one or more of the fourth through sixth aspects, process 2000 includes scheduling a PUSCH communication to be transmitted by a second network node in the reporting slot, wherein the PUSCH communication includes at least one of uplink control information or uplink shared channel data.

In an eighth aspect, alone or in combination with one or more of the fourth through seventh aspects, the value of the CSI slot offset value is based on a slot represented by a maximum of a CSI offset value indicated by a CLI reporting configuration or a slot associated with a next scheduled PUSCH transmission. In a ninth aspect, alone or in combination with the eighth aspect, process 2000 includes transmitting an uplink scheduling DCI including a PUSCH allocation that indicates the next scheduled PUSCH transmission.

In a tenth aspect, alone or in combination with one or more of the first through ninth aspects, process 2000 includes receiving the CSI in a reporting slot. In an eleventh aspect, alone or in combination with the tenth aspect, the CSI offset value represents n−1 slots between a reporting slot and a reference slot, wherein n is the CSI offset value. In a twelfth aspect, alone or in combination with the eleventh aspect, process 2000 includes transmitting, to a second network node, a GC DCI transmission in the reference slot. In a thirteenth aspect, alone or in combination with one or more of the eleventh or twelfth aspects, the reference slot includes one or more allocated interference measurement resources.

In a fourteenth aspect, alone or in combination with one or more of the eleventh through thirteenth aspects, the n−1 slots between the reference slot and the reporting slot include all slots between the reference slot and the reporting slot. In a fifteenth aspect, alone or in combination with one or more of the eleventh through fourteenth aspects, n−1 slots between the reference slot and the reporting slot include one or more slots in which uplink resources are capable of occurring.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
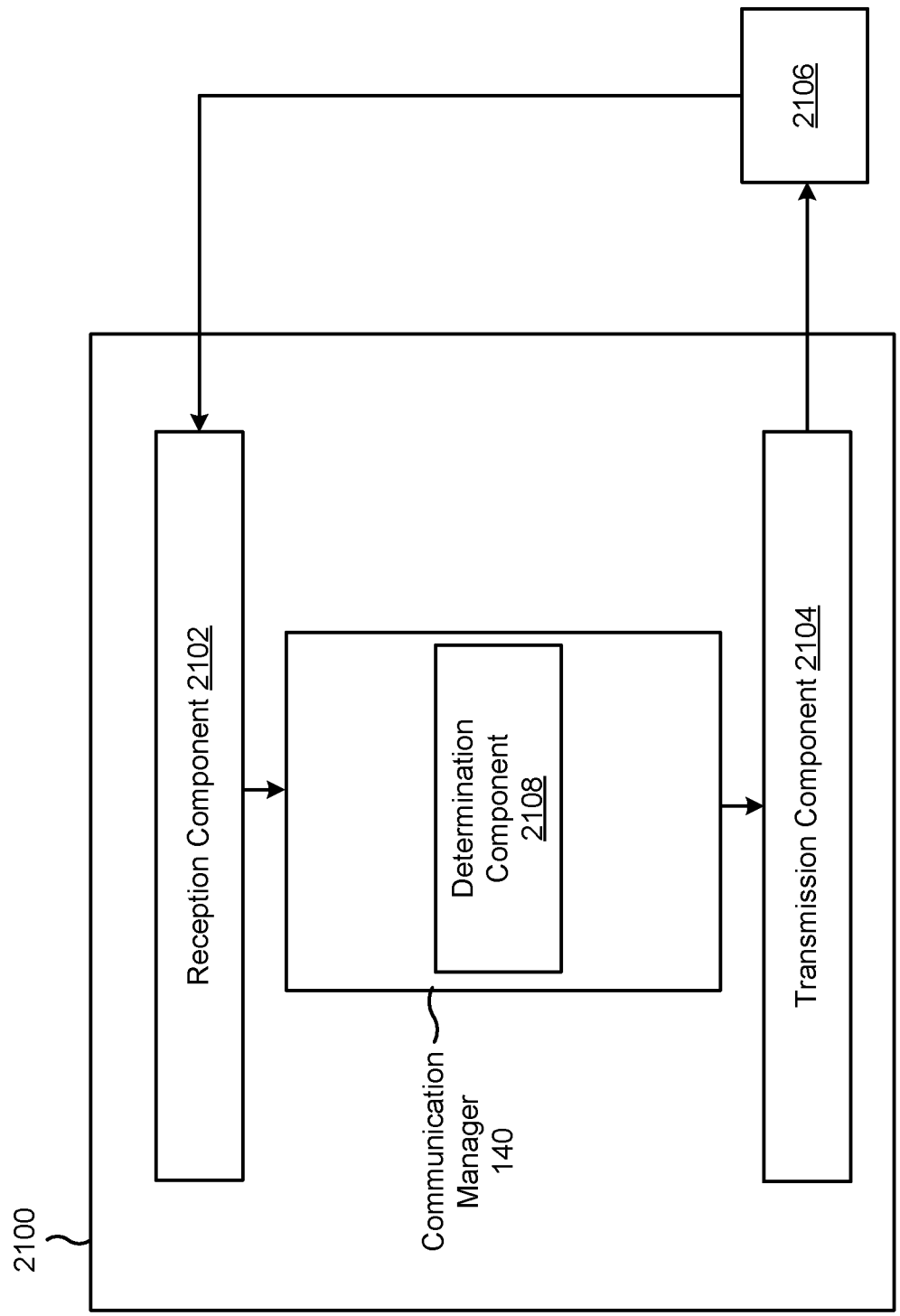
FIGS. 21 and 22 are diagrams of example apparatuses for wireless communication, in accordance with the present disclosure.

FIG. 21 is a diagram of an example apparatus 2100 for wireless communication. The apparatus 2100 may be a network node (e.g., a first network node, a second network node, or a third network node, among other examples), or a network node may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, or another wireless communication device) using the reception component 2102 and the transmission component 2104. As further shown, the apparatus 2100 may include the communication manager 140. The communication manager 140 may include a determination component 2108.

In some aspects, the apparatus 2100 may be configured to perform one or more operations described herein in connection with FIGS. 12-14B. Additionally, or alternatively, the apparatus 2100 may be configured to perform one or more processes described herein, such as process 1500 shown in FIG. 15, process 1700 shown in FIG. 17, process 1900 shown in FIG. 19, and/or a combination thereof, or a combination thereof. In some aspects, the apparatus 2100 and/or one or more components shown in FIG. 21 may include one or more components of the UE described in connection with FIG. 2. Additionally, or alternatively, one or more components shown in FIG. 21 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2100. In some aspects, the reception component 2102 may include one or more antennas, a modem, a demodulator, a MIMO detector, a receive processor, a controller/processor, a memory, or a combination thereof, of the UE described in connection with FIG. 2.

The transmission component 2104 may transmit communications, such as reference signals, control information, data communications, or a combination thereof, to the apparatus 2106. In some aspects, one or more other components of the apparatus 2100 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modem, a modulator, a transmit MIMO processor, a transmit processor, a controller/processor, a memory, or a combination thereof, of the UE described in connection with FIG. 2. In some aspects, the transmission component 2104 may be co-located with the reception component 2102 in a transceiver.

The reception component 2102 may receive a GC DCI transmission comprising a CLI measurement request indication. The communication manager 140 and/or the determination component 2108 may determine a CSI-IM during an interference measurement occasion, wherein the interference measurement occasion is indicated by the CLI measurement request indication. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 2102 and/or the transmission component 2104. In some aspects, the determination component 2108 may include one or more antennas, a modem, a modulator, a transmit MIMO processor, a transmit processor, a controller/processor, a memory, or a combination thereof, of the UE described in connection with FIG. 2. In some aspects, the determination component 2108 may include the reception component 2102 and/or the transmission component 2104.

The determination component 2108 may determine the interference measurement occasion based on the CLI measurement request indication.

The reception component 2102 may receive a CSI-IM configuration that includes a CSI-IM resource set configuration that indicates the aperiodic triggering offset value. The reception component 2102 may receive a CSI-IM configuration that includes information indicative of available reference slot indication values. The reception component 2102 may receive a CSI-IM configuration that excludes information indicative of available reference slot indication values, and a reference slot indication default value is zero.

The transmission component 2104 may transmit capability information that indicates a capability of a network node to measure CLI, wherein receiving the GC DCI transmission comprises receiving the GC DCI transmission based on transmitting the capability information.

The reception component 2102 may receive a GC DCI transmission comprising an A-SRS request indication. The transmission component 2104 may transmit an SRS based on the A-SRS request indication. The reception component 2102 may receive a flexible A-SRS configuration that includes information indicative of available slot offset indicator values, wherein the A-SRS request indication indicates a first value of the available slot offset indicator values.

The reception component 2102 may receive a DCI transmission that schedules a transmission of a CLI report that includes cross-link interference measurement information, wherein the DCI transmission includes an uplink shared channel indicator that indicates whether the CLI report is to be transmitted on a PUSCH. The transmission component 2104 may transmit the CLI report based on the DCI transmission. The reception component 2102 may receive a PUSCH configuration that indicates at least one of a CLI report slot offset value, a start and length indicator value, or a PUSCH mapping type. The reception component 2102 may receive a CLI report configuration that indicates a CLI report slot offset value.

The determination component 2108 may determine that a network node is scheduled to transmit a PUSCH communication during the reporting slot, wherein transmitting the CLI report comprises multiplexing the CLI report with the PUSCH communication on the PUSCH.

The reception component 2102 may receive a PUSCH allocation to be used to transmit the CLI report, wherein transmitting the CLI report comprises transmitting the CLI report according to the PUSCH allocation. The determination component 2108 may determine a slot associate with the value of the CLI report slot offset value based on a maximum of a CLI report offset value indicated by a CLI reporting configuration or a slot associated with a next scheduled PUSCH transmission. The reception component 2102 may receive an uplink scheduling DCI that indicates a PUSCH allocation that indicates the next scheduled PUSCH transmission. The determination component 2108 may determine a reporting slot based on a reference slot and a count of slots forward in time from the reference slot in accordance with the CLI report offset value.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of (one or more) components shown in FIG. 21 may perform one or more functions described as being performed by another set of components shown in FIG. 21.

Figure 22:
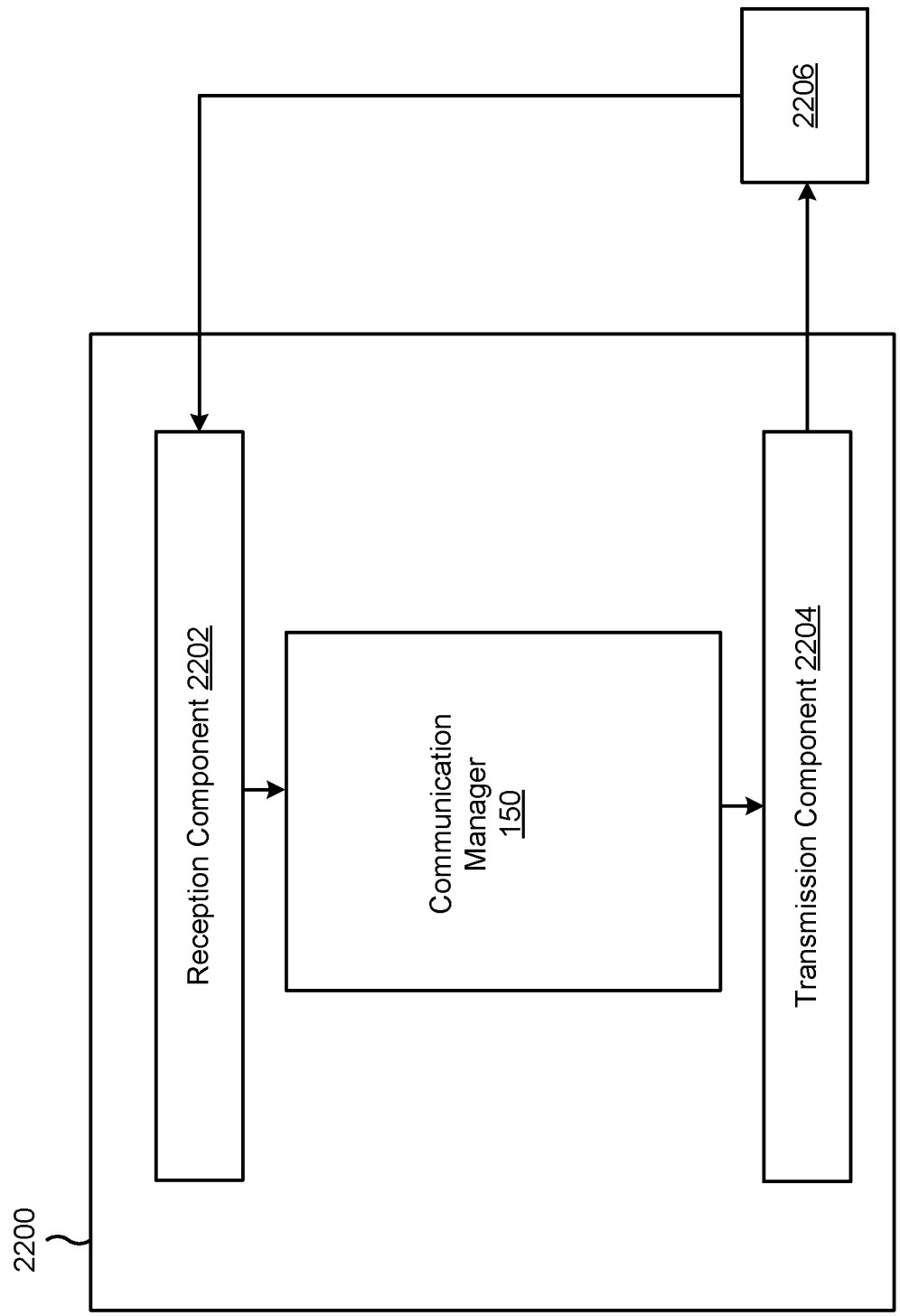

FIG. 22 is a diagram of an example apparatus 2200 for wireless communication. The apparatus 2200 may be a network node (e.g., a first network node or a second network node), or a network node may include the apparatus 2200. In some aspects, the apparatus 2200 includes a reception component 2202 and a transmission component 2204, which may be in communication with one another (for example, via one or more buses and/or one or more other components). As shown, the apparatus 2200 may communicate with another apparatus 2206 (such as a UE, a base station, or another wireless communication device) using the reception component 2202 and the transmission component 2204. As further shown, the apparatus 2200 may include the communication manager 150.

In some aspects, the apparatus 2200 may be configured to perform one or more operations described herein in connection with FIGS. 12-14B. Additionally, or alternatively, the apparatus 2200 may be configured to perform one or more processes described herein, such as process 1600 of FIG. 16, process 1800 of FIG. 18, process 2000 of FIG. 20, or a combination thereof. In some aspects, the apparatus 2200 and/or one or more components shown in FIG. 22 may include one or more components of the base station described in connection with FIG. 2. Additionally, or alternatively, one or more components shown in FIG. 22 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2202 may receive communications, such as reference signals, control information, data communications, or a combination thereof, from the apparatus 2206. The reception component 2202 may provide received communications to one or more other components of the apparatus 2200. In some aspects, the reception component 2202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2200. In some aspects, the reception component 2202 may include one or more antennas, a modem, a demodulator, a MIMO detector, a receive processor, a controller/processor, a memory, or a combination thereof, of the base station described in connection with FIG. 2.

The transmission component 2204 may transmit communications, such as reference signals, control information, data communications, or a combination thereof, to the apparatus 2206. In some aspects, one or more other components of the apparatus 2200 may generate communications and may provide the generated communications to the transmission component 2204 for transmission to the apparatus 2206. In some aspects, the transmission component 2204 may perform signal processing on the generated communications (such as filtering, amplification, modulation, digital-to-analog conversion, multiplexing, interleaving, mapping, or encoding, among other examples), and may transmit the processed signals to the apparatus 2206. In some aspects, the transmission component 2204 may include one or more antennas, a modem, a modulator, a transmit MIMO processor, a transmit processor, a controller/processor, a memory, or a combination thereof, of the base station described in connection with FIG. 2. In some aspects, the transmission component 2204 may be co-located with the reception component 2202 in a transceiver.

The communication manager 150 and/or the transmission component 2204 may transmit a GC DCI transmission comprising a CLI measurement request indication. The reception component 2202 may receive CLI information based on a CSI-IM associated with an interference measurement occasion, wherein the interference measurement occasion is indicated by the CLI measurement request indication. In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 2202 and/or the transmission component 2204.

The transmission component 2204 may transmit a CSI-IM configuration that includes a CSI-IM resource set configuration that indicates the aperiodic triggering offset value. The transmission component 2204 may transmit a CSI-IM configuration that includes information indicative of available reference slot indication values. The transmission component 2204 may transmit a CSI-IM configuration that excludes information indicative of available reference slot indication values, and a reference slot indication default value is zero. The reception component 2202 may receive capability information that indicates a capability of a network node to measure CLI, wherein transmitting the GC DCI transmission comprises transmitting the GC DCI transmission based on receiving the capability information.

The transmission component 2204 may transmit a GC DCI transmission comprising an A-SRS request indication. The reception component 2202 may receive an SRS based on the A-SRS request indication. The transmission component 2204 may transmit a flexible A-SRS configuration that includes information indicative of available slot offset indicator values, wherein the A-SRS request indication indicates a first value of the available slot offset indicator values.

The transmission component 2204 may transmit a DCI transmission that schedules a transmission of CLI that includes cross-link interference measurement information, wherein the DCI transmission includes an uplink shared channel indicator that indicates whether the CLI report is to be transmitted on a PUSCH. The reception component 2202 may receive the CLI based on the DCI transmission.

The transmission component 2204 may transmit a CLI configuration that indicates a CLI slot offset value. The transmission component 2204 may transmit a PUSCH allocation to be used to transmit the CLI, wherein receiving the CLI comprises receiving the CLI according to the PUSCH allocation. The transmission component 2204 may transmit an uplink scheduling DCI that indicates a PUSCH allocation that indicates the next scheduled PUSCH transmission.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of (one or more) components shown in FIG. 22 may perform one or more functions described as being performed by another set of components shown in FIG. 22.

The following provides an overview of some Aspects of the present disclosure:

Aspect 1: A method of wireless communication performed by a first network node, comprising: receiving a group common downlink control information (GC DCI) transmission comprising a cross-link interference (CLI) measurement request indication; and determining a channel state information (CSI)-interference measurement (IM) during an interference measurement occasion, wherein the interference measurement occasion is indicated by the CLI measurement request indication.

Aspect 2: The method of Aspect 1, further comprising determining the interference measurement occasion based at least in part on the CLI measurement request indication.

Aspect 3: The method of either of Aspects 1 or 2, wherein the interference measurement occasion comprises an interference measurement slot, the method further comprising determining the interference measurement slot based at least in part on an aperiodic triggering offset value.

Aspect 4: The method of Aspect 3, further comprising receiving a CSI-IM configuration that includes information indicative of the aperiodic triggering offset value.

Aspect 5: The method of Aspect 4, wherein the information indicative of the aperiodic triggering offset parameter comprises a CSI-IM configuration.

Aspect 6: The method of either of Aspects 4 or 5, wherein the aperiodic triggering offset value represents n−1 slots between a reference slot and the interference measurement slot, wherein n is the aperiodic triggering offset value.

Aspect 7: The method of Aspect 6, further comprising receiving the GC DCI transmission in the reference slot.

Aspect 8: The method of either of Aspects 6 or 7, wherein the n−1 slots between the reference slot and the interference measurement slot include all slots between the reference slot and the interference measurement slot.

Aspect 9: The method of either of Aspects 6 or 7, wherein the n−1 slots between the reference slot and the interference measurement slot include only at least one of: one or more slots in which one or more uplink resources are capable of occurring and that have one or more flexible resources, or one or more slots designated as downlink plus uplink slots.

Aspect 10: The method of either of Aspects 6 or 7, wherein the n−1 slots between the reference slot and the interference measurement slot include only at least one of: one or more slots in which one or more downlink resources are capable of occurring and that have one or more flexible resources, or one or more slots designated as downlink plus uplink slots.

Aspect 11: The method of either of Aspects 6 or 7, wherein the n−1 slots between the reference slot and the interference measurement slot are slots in which intra-cell crosslink interference is capable of occurring.

Aspect 12: The method of any of Aspects 6-11, further comprising receiving a CSI-IM configuration that includes information indicative of available reference slot indication values.

Aspect 13: The method of Aspect 12, wherein the CLI measurement request indication indicates a first reference slot indication value of the available reference slot indication values.

Aspect 14: The method of Aspect 6, further comprising receiving a CSI-IM configuration that excludes information indicative of available reference slot indication values, wherein a reference slot indication default value is zero.

Aspect 15: The method of any of Aspects 6-14, further comprising receiving, from a second network node, an aperiodic sounding reference signal (A-SRS) in the reference slot.

Aspect 16: The method of Aspect 15, wherein the GC DCI transmission indicates a reference slot indication value corresponding to the A-SRS and the interference measurement occasion.

Aspect 17: The method of Aspect 16, wherein the GC DCI transmission comprises a one-part GC DCI transmission that includes a dedicated slot indication value field, including first information.

Aspect 18: The method of Aspect 17, wherein the GC DCI transmission includes an SRS request field and a CLI request field including second information, the method comprising decoding the dedicated slot indication value field and the CLI request field.

Aspect 19: The method of Aspect 18, further comprising using the first information and the second information for determining the interference measurement occasion.

Aspect 20: The method of any of Aspects 16-19, wherein the GC DCI transmission comprises a two-part GC DCI transmission comprising a first block corresponding to an SRS request and a second block corresponding to a CLI request field, the method comprising decoding the second block.

Aspect 21: The method of any of Aspects 1-20, further comprising transmitting capability information that indicates a capability of the first network node to measure CLI, wherein receiving the GC DCI transmission comprises receiving the GC DCI transmission based at least in part on transmitting the capability information.

Aspect 22: A method of wireless communication performed by a first network node, comprising: transmitting a group common downlink control information (GC DCI) transmission comprising a cross-link interference (CLI) measurement request indication; and receiving CLI information based at least in part on a channel state information (CSI)-interference measurement (IM) associated with an interference measurement occasion, wherein the interference measurement occasion is indicated by the CLI measurement request indication.

Aspect 23: The method of Aspect 22, wherein the interference measurement occasion is based at least in part on the CLI measurement request indication.

Aspect 24: The method of either of Aspects 22 or 23, wherein the interference measurement occasion comprises an interference measurement slot, and wherein the interference measurement slot is based at least in part on an aperiodic triggering offset value.

Aspect 25: The method of Aspect 24, further comprising transmitting a CSI-IM configuration that includes information indicative of the aperiodic triggering offset value.

Aspect 26: The method of Aspect 25, wherein the information indicative of the aperiodic triggering offset parameter comprises a CSI-IM configuration.

Aspect 27: The method of any of Aspects 24-26, wherein the aperiodic triggering offset value represents n−1 slots between a reference slot and the interference measurement slot, wherein n is the aperiodic triggering offset value.

Aspect 28: The method of Aspect 27, further comprising transmitting the GC DCI transmission in the reference slot.

Aspect 29: The method of either of Aspects 27 or 28, wherein the n−1 slots between the reference slot and the interference measurement slot include all slots between the reference slot and the interference measurement slot.

Aspect 30: The method of either of Aspects 27 or 28, wherein the n−1 slots between the reference slot and the interference measurement slot include only at least one of: one or more slots in which one or more uplink resources are capable of occurring and that have one or more flexible resources, or one or more slots designated as downlink plus uplink slots.

Aspect 31: The method of either of Aspects 27 or 28, wherein the n−1 slots between the reference slot and the interference measurement slot include only at least one of: one or more slots in which one or more downlink resources are capable of occurring and that have one or more flexible resources, or one or more slots designated as downlink plus uplink slots.

Aspect 32: The method of either of Aspects 27 or 28, wherein the n−1 slots between the reference slot and the interference measurement slot are slots in which intra-cell crosslink interference is capable of occurring.

Aspect 33: The method of any of Aspects 27-32, further comprising transmitting a CSI-IM configuration that includes information indicative of available reference slot indication values.

Aspect 34: The method of Aspect 33, wherein the CLI measurement request indication indicates a first reference slot indication value of the available reference slot indication values.

Aspect 35: The method of any of Aspects 27-33, further comprising transmitting a CSI-IM configuration that excludes information indicative of available reference slot indication values, wherein a reference slot indication default value is zero.

Aspect 36: The method of any of Aspects 27-35, further comprising scheduling, in the reference slot, transmission of an aperiodic sounding reference signal (A-SRS) by a second network node.

Aspect 37: The method of Aspect 36, wherein the GC DCI transmission indicates a reference slot indication value corresponding to the A-SRS and the interference measurement occasion.

Aspect 38: The method of Aspect 37, wherein the GC DCI transmission comprises a one-part GC DCI transmission that includes a dedicated slot indication value field including first information.

Aspect 39: The method of Aspect 38, wherein the GC DCI transmission includes an SRS request field and a CLI request field including second information.

Aspect 40: The method of any of Aspects 37-39, wherein the GC DCI transmission comprises a two-part GC DCI transmission comprising a first block corresponding to an SRS request and a second block corresponding to a CLI request field.

Aspect 41: The method of any of Aspects 22-40, further comprising receiving capability information that indicates a capability of the first network node to measure CLI, wherein transmitting the GC DCI transmission comprises transmitting the GC DCI transmission based at least in part on receiving the capability information.

Aspect 42: A method of wireless communication performed by a network node, comprising: receiving a group common downlink control information (GC DCI) transmission comprising an aperiodic sounding reference signal (A-SRS) request indication; and transmitting an SRS based at least in part on the A-SRS request indication.

Aspect 43: The method of Aspect 42, wherein transmitting the SRS comprises transmitting the SRS in an SRS transmission slot.

Aspect 44: The method of Aspect 43, wherein a first reference slot offset value represents where a first reference slot is relative to a second reference slot, wherein a second slot offset value represents where the SRS transmission slot is relative to the first reference slot, and wherein the first reference slot is between the second reference slot and the SRS transmission slot.

Aspect 45: The method of Aspect 43, further comprising receiving radio resource control (RRC) signaling or medium access control (MAC) control element (MAC-CE) signaling, wherein the RRC signaling or the MAC-CE signaling includes information indicative of available reference slot offset values, wherein the available reference slot offset values include the first reference slot offset value, and wherein the A-SRS request indication indicates the first reference slot offset value.

Aspect 46: The method of either of Aspects 44 or 45, wherein the first reference slot offset value is two bits in length.

Aspect 47: A method of wireless communication performed by a network node, comprising: transmitting a group common downlink control information (GC DCI) transmission comprising an aperiodic sounding reference signal (A-SRS) request indication; and receiving an SRS based at least in part on the A-SRS request indication.

Aspect 48: The method of Aspect 47, wherein receiving the SRS comprises receiving the SRS in an SRS transmission slot.

Aspect 49: The method of Aspect 48, wherein a first reference slot offset value represents where a first reference slot is relative to a second reference slot, wherein a second slot offset value represents where the SRS transmission slot is relative to the first reference slot, and wherein the first reference slot is between the second reference slot and the SRS transmission slot.

Aspect 50: The method of Aspect 48, further comprising transmitting radio resource control (RRC) signaling or medium access control (MAC) control element (MAC-CE) signaling, wherein the RRC signaling or the MAC-CE signaling includes information indicative of available reference slot offset values, wherein the available reference slot offset values include the first reference slot offset value, and wherein the A-SRS request indication indicates the first reference slot offset value.

Aspect 51: The method of either of Aspects 49 or 50, wherein the first reference slot offset value is two bits in length.

Aspect 52: A method of wireless communication performed by a network node, comprising: receiving a downlink control information (DCI) transmission that schedules a transmission of channel state information (CSI) that includes cross-link interference measurement information, wherein the DCI transmission includes an uplink shared channel indicator that indicates whether the CSI is to be transmitted on a physical uplink shared channel (PUSCH); and transmitting the CSI based at least in part on the DCI transmission.

Aspect 53: The method of Aspect 52, wherein transmitting the CSI comprises: transmitting a transport block on the PUSCH based at least in part on the uplink shared channel indicator having a first value of a set of two values, wherein the transport block includes the CSI report, or transmitting the CSI on the PUSCH without a transport block based at least in part on the shared uplink channel indicator having a second value of the set of two values.

Aspect 54: The method of Aspect 53, further comprising receiving a PUSCH configuration that indicates at least one of a CSI slot offset value, a start and length indicator value, or a PUSCH mapping type.

Aspect 55: The method of either of Aspects 53 or 54, further comprising receiving a CSI configuration that indicates a CSI slot offset value.

Aspect 56: The method of any of Aspects 52-55, wherein transmitting the CSI comprises transmitting the CSI in a reporting slot based at least in part on a CSI slot offset value.

Aspect 57: The method of Aspect 56, wherein transmitting the CSI comprises multiplexing the CSI with a PUSCH communication based at least in part on the PUSCH communication being scheduled to be transmitted in the reporting slot.

Aspect 58: The method of either of Aspects 56 or 57, further comprising receiving a PUSCH allocation to be used to transmit the CSI, wherein transmitting the CSI comprises transmitting the CSI according to the PUSCH allocation.

Aspect 59: The method of any of Aspects 56-58, further comprising receiving scheduling information indicative of a PUSCH communication scheduled for the reporting slot, wherein the PUSCH communication includes at least one of uplink control information or uplink shared channel data.

Aspect 60: The method of any of Aspects 56-59, wherein the value of the CSI slot offset value is based at least in part on a slot represented by a maximum of a CSI offset value indicated by a CLI reporting configuration or a slot associated with a next scheduled PUSCH transmission.

Aspect 61: The method of Aspect 60, further comprising receiving an uplink scheduling DCI including a PUSCH allocation that indicates the next scheduled PUSCH transmission.

Aspect 62: The method of any of Aspects 52-61, wherein the CSI offset parameter value represents n−1 slots between a reference slot and a reporting slot, wherein n is the CSI offset parameter value.

Aspect 63: The method of Aspect 62, further comprising receiving a group common downlink control information (GC DCI) transmission in the reference slot.

Aspect 64: The method of either of Aspects 62 or 63, wherein one or more interference measurement resources are allocated for the reference slot.

Aspect 65: The method of any of Aspects 62-64, wherein the n−1 slots between the reference slot and the reporting slot include all slots between the reference slot and the reporting slot.

Aspect 66: The method of any of Aspects 62-64, wherein the n−1 slots between the reference slot and the reporting slot include one or more slots in which one or more uplink resources are capable of occurring.

Aspect 67: A method of wireless communication performed by a network node, comprising: transmitting a downlink control information (DCI) transmission that schedules a transmission of channel state information (CSI) that includes cross-link interference measurement information, wherein the DCI transmission includes an uplink shared channel indicator that indicates whether the CSI is to be transmitted on a physical uplink shared channel (PUSCH); and receiving the CSI based at least in part on the DCI transmission.

Aspect 68: The method of Aspect 67, wherein the uplink shared channel indicator has a first value of a set of two values, and wherein receiving the CSI comprises: receiving a transport block on the PUSCH based at least in part on the uplink shared channel indicator having a first value of a set of two values, wherein the transport block includes the CSI, or receiving the CSI on the PUSCH without a transport block based at least in part on the shared uplink channel indicator having a second value of the set of two values.

Aspect 69: The method of Aspect 68, further comprising transmitting a PUSCH configuration that indicates at least one of a CSI slot offset value, a start and length indicator value, or a PUSCH mapping type.

Aspect 70: The method of either of Aspects 68 or 69, further comprising transmitting a CSI configuration that indicates a CSI slot offset value.

Aspect 71: The method of any of Aspects 67-70, wherein receiving the CSI comprises receiving the CSI in a reporting slot based at least in part a CSI slot offset value.

Aspect 72: The method of Aspect 71, wherein the CSI is multiplexed on the PUSCH.

Aspect 73: The method of either of Aspects 71 or 72, further comprising transmitting a PUSCH allocation to be used to transmit the CSI, wherein receiving the CSI comprises receiving the CSI according to the PUSCH allocation.

Aspect 74: The method of any of Aspects 71-73, further comprising scheduling a PUSCH communication to be transmitted by a second network node in the reporting slot, wherein the PUSCH communication includes at least one of uplink control information or uplink shared channel data.

Aspect 75: The method of any of Aspects 71-74, wherein the value of the CSI slot offset value is based at least in part on a slot represented by a maximum of a CSI offset value indicated by a CLI reporting configuration or a slot associated with a next scheduled PUSCH transmission.

Aspect 76: The method of Aspect 75, further comprising transmitting an uplink scheduling DCI including a PUSCH allocation that indicates the next scheduled PUSCH transmission.

Aspect 77: The method of any of Aspects 67-76, further comprising receiving the CSI in a reporting slot.

Aspect 78: The method of Aspect 77, wherein the CSI offset value represents n−1 slots between a reporting slot and a reference slot, wherein n is the CSI offset value.

Aspect 79: The method of Aspect 78, further comprising transmitting, to a second network node, a group common downlink control information (GC DCI) transmission in the reference slot.

Aspect 80: The method of either of Aspects 78 or 79, wherein the reference slot includes one or more allocated interference measurement resources.

Aspect 81: The method of any of Aspects 78-80, wherein the n−1 slots between the reference slot and the reporting slot include all slots between the reference slot and the reporting slot.

Aspect 82: The method of any of Aspects 78-80, wherein n−1 slots between the reference slot and the reporting slot include one or more slots in which one or more uplink resources are capable of occurring.

Aspect 83: An apparatus for wireless communication at a device, comprising a processor; memory coupled with the processor; and instructions stored in the memory and executable by the processor to cause the apparatus to perform the method of one or more of Aspects 1-21.

Aspect 84: A device for wireless communication, comprising a memory and one or more processors coupled to the memory, the one or more processors configured to perform the method of one or more of Aspects 1-21.

Aspect 85: An apparatus for wireless communication, comprising at least one means for performing the method of one or more of Aspects 1-21.

Aspect 86: A non-transitory computer-readable medium storing code for wireless communication, the code comprising instructions executable by a processor to perform the method of one or more of Aspects 1-21.

Aspect 87: A non-transitory computer-readable medium storing a set of instructions for wireless communication, the set of instructions comprising one or more instructions that, when executed by one or more processors of a device, cause the device to perform the method of one or more of Aspects 1-21.

Aspect 88: An apparatus for wireless communication at a device, comprising a processor; memory coupled with the processor; and instructions stored in the memory and executable by the processor to cause the apparatus to perform the method of one or more of Aspects 22-41.

Aspect 89: A device for wireless communication, comprising a memory and one or more processors coupled to the memory, the one or more processors configured to perform the method of one or more of Aspects 22-41.

Aspect 90: An apparatus for wireless communication, comprising at least one means for performing the method of one or more of Aspects 22-41.

Aspect 91: A non-transitory computer-readable medium storing code for wireless communication, the code comprising instructions executable by a processor to perform the method of one or more of Aspects 22-41.

Aspect 92: A non-transitory computer-readable medium storing a set of instructions for wireless communication, the set of instructions comprising one or more instructions that, when executed by one or more processors of a device, cause the device to perform the method of one or more of Aspects 22-41.

Aspect 93: An apparatus for wireless communication at a device, comprising a processor; memory coupled with the processor; and instructions stored in the memory and executable by the processor to cause the apparatus to perform the method of one or more of Aspects 42-46.

Aspect 94: A device for wireless communication, comprising a memory and one or more processors coupled to the memory, the one or more processors configured to perform the method of one or more of Aspects 42-46.

Aspect 95: An apparatus for wireless communication, comprising at least one means for performing the method of one or more of Aspects 42-46.

Aspect 96: A non-transitory computer-readable medium storing code for wireless communication, the code comprising instructions executable by a processor to perform the method of one or more of Aspects 42-46.

Aspect 97: A non-transitory computer-readable medium storing a set of instructions for wireless communication, the set of instructions comprising one or more instructions that, when executed by one or more processors of a device, cause the device to perform the method of one or more of Aspects 42-46.

Aspect 98: An apparatus for wireless communication at a device, comprising a processor; memory coupled with the processor; and instructions stored in the memory and executable by the processor to cause the apparatus to perform the method of one or more of Aspects 47-51.

Aspect 99: A device for wireless communication, comprising a memory and one or more processors coupled to the memory, the one or more processors configured to perform the method of one or more of Aspects 47-51.

Aspect 100: An apparatus for wireless communication, comprising at least one means for performing the method of one or more of Aspects 47-51.

Aspect 101: A non-transitory computer-readable medium storing code for wireless communication, the code comprising instructions executable by a processor to perform the method of one or more of Aspects 47-51.

Aspect 102: A non-transitory computer-readable medium storing a set of instructions for wireless communication, the set of instructions comprising one or more instructions that, when executed by one or more processors of a device, cause the device to perform the method of one or more of Aspects 47-51.

Aspect 103: An apparatus for wireless communication at a device, comprising a processor; memory coupled with the processor; and instructions stored in the memory and executable by the processor to cause the apparatus to perform the method of one or more of Aspects 52-66.

Aspect 104: A device for wireless communication, comprising a memory and one or more processors coupled to the memory, the one or more processors configured to perform the method of one or more of Aspects 52-66.

Aspect 105: An apparatus for wireless communication, comprising at least one means for performing the method of one or more of Aspects 52-66.

Aspect 106: A non-transitory computer-readable medium storing code for wireless communication, the code comprising instructions executable by a processor to perform the method of one or more of Aspects 52-66.

Aspect 107: A non-transitory computer-readable medium storing a set of instructions for wireless communication, the set of instructions comprising one or more instructions that, when executed by one or more processors of a device, cause the device to perform the method of one or more of Aspects 52-66.

Aspect 108: An apparatus for wireless communication at a device, comprising a processor; memory coupled with the processor; and instructions stored in the memory and executable by the processor to cause the apparatus to perform the method of one or more of Aspects 67-82.

Aspect 109: A device for wireless communication, comprising a memory and one or more processors coupled to the memory, the one or more processors configured to perform the method of one or more of Aspects 67-82.

Aspect 110: An apparatus for wireless communication, comprising at least one means for performing the method of one or more of Aspects 67-82.

Aspect 111: A non-transitory computer-readable medium storing code for wireless communication, the code comprising instructions executable by a processor to perform the method of one or more of Aspects 67-82.

Aspect 112: A non-transitory computer-readable medium storing a set of instructions for wireless communication, the set of instructions comprising one or more instructions that, when executed by one or more processors of a device, cause the device to perform the method of one or more of Aspects 67-82.

The foregoing disclosure provides illustration and description but is neither exhaustive nor limiting of the scope of this disclosure. For example, various aspects and examples are disclosed herein, but this disclosure is not limited to the precise form in which such aspects and examples are described. Additionally, the terms aspects and examples are used interchangeably. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, any combinations thereof, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art understand that software and hardware can be designed to implement the techniques described herein based on this disclosure.

Even though particular combinations of features are recited in the claims and/or disclosed in the specification, these combinations do not limit the scope of this disclosure to such particular combinations of features. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" covers at least the following non-limiting alternatives: a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and/or c+c+c).

No element, act, or instruction used herein should be construed as critical or essential unless explicitly described as such. Also, as used herein, the articles "a" and "an" include one or more items and may be used interchangeably with "one or more." Further, as used herein, the article "the" includes one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Also, as used herein, the term "or" is intended to be inclusive when used in a series and may be used interchangeably with "and/or," unless explicitly stated otherwise (e.g., if used in combination with "either" or "only one of"). As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

What is claimed is:

1. A first network node for wireless communication, comprising:
   a memory; and
   at least one processor communicatively coupled to the memory, wherein the at least one processor is configured to:
   receive a group common downlink control information (GC DCI) transmission comprising a cross-link interference (CLI) measurement request indication;
   receive a channel state information (CSI)-interference measurement (IM) configuration that includes information indicative of an aperiodic triggering offset value;
   determine an interference measurement slot based on the aperiodic triggering offset value, wherein:
   n is the aperiodic triggering offset value;
   the aperiodic triggering offset value represents n−1 slots between a reference slot and the interference measurement slot; and
   the n−1 slots between the reference slot and the interference measurement slot include one of: only one or more slots designated as downlink plus uplink slots, or only slots in which intra-cell crosslink interference is capable of occurring; and
   determine a CSI-IM during an interference measurement occasion, wherein:
   the interference measurement occasion is indicated by the CLI measurement request indication, and
   the interference measurement occasion comprises the interference measurement slot.

2. The first network node of claim 1, wherein the at least one processor is further configured to determine the interference measurement occasion based on the CLI measurement request indication.

3. The first network node of claim 1, wherein the information indicative of the aperiodic triggering offset value comprises a CSI-IM resource set configuration.

4. The first network node of claim 1, wherein the at least one processor is further configured to receive the GC DCI transmission in the reference slot.

5. The first network node of claim 1, wherein the n−1 slots between the reference slot and the interference measurement slot include only the slots in which the intra-cell crosslink interference is capable of occurring.

6. The first network node of claim 1, wherein the at least one processor is further configured to receive a CSI-IM configuration that includes information indicative of available reference slot indication values, and wherein the CLI measurement request indication indicates a first reference slot indication value of the available reference slot indication values.

7. The first network node of claim 1, wherein the at least one processor is further configured to receive a CSI-IM configuration that excludes information indicative of available reference slot indication values, wherein a reference slot indication default value is zero.

8. The first network node of claim 1, wherein the at least one processor is further configured to receive, from a second network node, an aperiodic sounding reference signal (A-SRS) in the reference slot.

9. The first network node of claim 8, wherein the GC DCI transmission indicates a reference slot indication value corresponding to the A-SRS and the interference measurement occasion.

10. The first network node of claim 9, wherein the GC DCI transmission comprises a one-part GC DCI transmission that includes:
   a dedicated slot indication value field, including first information;
   an SRS request field; and
   a CLI request field including second information; and wherein the at least one processor is further configured to use the first information and the second information for determining the interference measurement occasion.

11. The first network node of claim 9, wherein the GC DCI transmission comprises a two-part GC DCI transmission comprising a first block corresponding to an SRS request and a second block corresponding to a CLI request field, and wherein the at least one processor is further configured to decode the second block.

12. The first network node of claim 1, wherein the at least one processor is further configured to transmit capability information that indicates a capability of the first network node to measure CLI, wherein the at least one processor, to receive the GC DCI transmission, is configured to receive the GC DCI transmission based on transmission of the capability information.

13. The first network node of claim 1, wherein the n−1 slots between the reference slot and the interference measurement slot include only the one or more slots designated as downlink plus uplink slots.

14. A first network node for wireless communication, comprising:
   a memory; and
   at least one processor communicatively coupled to the memory, wherein the at least one processor is configured to:
      transmit a group common downlink control information (GC DCI) transmission comprising a cross-link interference (CLI) measurement request indication; and
      receive CLI information based on a channel state information (CSI)-interference measurement (IM) associated with an interference measurement occasion, wherein the interference measurement occasion is indicated by the CLI measurement request indication, wherein reception of the CLI information is in accordance with a slot offset value from a reference slot comprising the interference measurement occasion, and wherein a value of the slot offset value is based on:
         a slot represented by a maximum of a CLI offset value indicated by a CLI reporting configuration, or
         a slot associated with a next scheduled physical uplink shared channel (PUSCH) transmission.

15. The first network node of claim 14, wherein the interference measurement occasion is based on the CLI measurement request indication.

16. The first network node of claim 15, wherein the interference measurement occasion comprises an interference measurement slot, and wherein the interference measurement slot is based on an aperiodic triggering offset value.

17. The first network node of claim 16, wherein the at least one processor is further configured to transmit a CSI-IM configuration that includes information indicative of the aperiodic triggering offset value.

18. The first network node of claim 14, wherein the value of the slot offset value is based on the slot represented by the maximum of the CLI offset value indicated by the CLI reporting configuration.

19. The first network node of claim 14, wherein the value of the slot offset value is based on the slot associated with the next scheduled PUSCH transmission.

20. A network node for wireless communication, comprising:
   a memory; and
   at least one processor communicatively coupled to the memory, wherein the at least one processor is configured to:
      receive a group common downlink control information (GC DCI) transmission comprising an aperiodic sounding reference signal (A-SRS) request indication, wherein the GC DCI transmission comprises a two-part GC DCI transmission comprising a first block corresponding to the A-SRS request indication and a second block corresponding to a cross-link interference (CLI) request field;
      transmit, in an interference measurement occasion, an SRS based on the A-SRS request indication; and
      transmit CLI information in accordance with a slot offset value from a reference slot comprising the interference measurement occasion.

21. The network node of claim 20, wherein the at least one processor, to transmit the SRS, is configured to transmit the SRS in an SRS transmission slot.

22. The network node of claim 21, wherein a first reference slot offset value represents where a first reference slot is relative to a second reference slot, wherein a second slot offset value represents where the SRS transmission slot is relative to the first reference slot, and wherein the first reference slot is between the second reference slot and the SRS transmission slot.

23. The network node of claim 22, wherein the at least one processor is further configured to:
   receive radio resource control (RRC) signaling or medium access control (MAC) control element (MAC-CE) signaling, wherein the RRC signaling or the MAC-CE signaling includes information indicative of available reference slot offset values, wherein the available reference slot offset values include the first reference slot offset value, and wherein the A-SRS request indication indicates the first reference slot offset value.

24. The network node of claim 23, wherein the first reference slot offset value is two bits in length.

25. A network node for wireless communication, comprising:
   a memory; and
   at least one processor communicatively coupled to the memory, wherein the at least one processor is configured to:
      receive a group common downlink control information (GC DCI) transmission that schedules a transmission of cross-link interference (CLI) measurement information; and
      transmit the CLI measurement information based on the GC DCI transmission, wherein transmission of the CLI information is in accordance with a slot offset value from a reference slot comprising an interference measurement occasion, and wherein a value of the slot offset value is based on:
         a slot represented by a maximum of a CLI offset value indicated by a CLI reporting configuration, or
         a slot associated with a next scheduled physical uplink shared channel (PUSCH) transmission.

26. The network node of claim 25, wherein the at least one processor, to transmit the CLI measurement information, is configured to transmit the CLI measurement information in a reporting slot based on the slot offset value.

27. The network node of claim 26, wherein the at least one processor, to transmit the CLI measurement information, is configured to multiplex the CLI measurement information with the next scheduled PUSCH transmission that is scheduled in the reporting slot.

28. The network node of claim 26, wherein the at least one processor is further configured to receive an indication that the network node is scheduled to transmit, in a first slot, the next scheduled PUSCH transmission including at least one of uplink control information or uplink shared channel data, wherein the first slot comprises the reporting slot.

29. The network node of claim 25, wherein the at least one processor is further configured to receive a PUSCH allocation configuration to be used to transmit the CLI measurement information, wherein the at least one processor, to transmit the CLI measurement information, is configured to transmit the CLI measurement information according to the PUSCH allocation.

30. The network node of claim 25, wherein the at least one processor is further configured to receive an uplink scheduling downlink control information transmission that indicates the next scheduled PUSCH transmission.

31. The network node of claim 25, wherein the value of the slot offset value is based on the slot represented by the maximum of the CLI offset value indicated by the CLI reporting configuration.

32. The network node of claim 25, wherein the value of the slot offset value is based on the slot associated with the next scheduled PUSCH transmission.

33. A first network node for wireless communication, comprising:
   a memory; and
   at least one processor communicatively coupled to the memory, wherein the at least one processor is configured to:
      receive a group common downlink control information (GC DCI) transmission comprising a cross-link interference (CLI) measurement request indication, wherein the GC DCI transmission comprises a two-part GC DCI transmission comprising a first block corresponding to a sounding reference signal (SRS) request and a second block corresponding to a CLI request field;
      decode the second block; and
      determine a channel state information (CSI)-interference measurement (IM) during an interference measurement occasion, wherein the interference measurement occasion is indicated by the CLI measurement request indication.

34. The first network node of claim 33, wherein the interference measurement occasion comprises an interference measurement slot, and wherein the at least one processor is further configured to determine the interference measurement slot based on an aperiodic triggering offset value.

35. The first network node of claim 34, wherein the at least one processor is further configured to receive a CSI-IM configuration that includes information indicative of the aperiodic triggering offset value.

36. The first network node of claim 35, wherein the aperiodic triggering offset value represents n−1 slots between a reference slot and the interference measurement slot, and wherein n is the aperiodic triggering offset value.

37. The first network node of claim 36, wherein the at least one processor is further configured to receive, from a second network node, an aperiodic sounding reference signal (A-SRS) in the reference slot.

38. The first network node of claim 37, wherein the GC DCI transmission indicates a reference slot indication value corresponding to the A-SRS and the interference measurement occasion.

\* \* \* \* \*